United States Patent
Snediker et al.

(10) Patent No.: US 10,878,135 B2
(45) Date of Patent: Dec. 29, 2020

(54) WIRELESS DEVICE SECURITY SYSTEM

(71) Applicant: Apple Inc., Cupertino, CA (US)

(72) Inventors: Russell E. Snediker, Scotts Valley, CA (US); Vinay Subramanian, San Jose, CA (US); David A. Den Boer, San Martin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/263,645

(22) Filed: Jan. 31, 2019

(65) Prior Publication Data

US 2019/0163937 A1 May 30, 2019

Related U.S. Application Data

(63) Continuation of application No. 15/608,925, filed on May 30, 2017, now Pat. No. 10,223,553.

(51) Int. Cl.
| | |
|---|---|
| G08B 13/14 | (2006.01) |
| G06F 21/88 | (2013.01) |
| G08B 21/02 | (2006.01) |
| H04M 1/725 | (2006.01) |
| G08B 13/24 | (2006.01) |
| H04M 1/04 | (2006.01) |

(52) U.S. Cl.
CPC ............ *G06F 21/88* (2013.01); *G08B 13/14* (2013.01); *G08B 13/1427* (2013.01); *G08B 13/24* (2013.01); *G08B 21/0233* (2013.01); *G08B 21/0277* (2013.01); *H04M 1/04* (2013.01); *H04M 1/72577* (2013.01); *G06F 2221/2111* (2013.01)

(58) Field of Classification Search
None
See application file for complete search history.

(56) References Cited

U.S. PATENT DOCUMENTS

| | | | | |
|---|---|---|---|---|
| 8,826,039 | B2* | 9/2014 | Chou | ..................... G06F 21/72 |
| | | | | 713/193 |
| 9,118,655 | B1* | 8/2015 | Paczkowski | .......... H04W 12/06 |
| 9,786,145 | B2* | 10/2017 | Oppenheimer | ........ G08B 21/24 |
| 9,922,520 | B2* | 3/2018 | Shechter | ............ G08B 21/0261 |
| 2008/0065908 | A1* | 3/2008 | Appaji | ..................... G06F 21/82 |
| | | | | 713/193 |
| 2009/0315767 | A1* | 12/2009 | Scalisi | .................... G01S 19/34 |
| | | | | 342/357.74 |
| 2010/0138298 | A1* | 6/2010 | Fitzgerald | ............... H04L 63/12 |
| | | | | 705/14.53 |

(Continued)

*Primary Examiner* — Julie B Lieu
(74) *Attorney, Agent, or Firm* — Morgan, Lewis & Bockius LLP

(57) ABSTRACT

A device in a wireless device security system may include at least one processor configured to determine a location of the device with respect to a security area. The at least one processor may be further configured to provide an alert output when the determined location of the device is proximate to a boundary of the security area. The at least one processor may be further configured to prevent the device from responding to at least some user input when the determined location of the device is outside of the security area. The at least one processor may be further configured to provide a disturbance output when the determined location of the device is outside of the security area.

20 Claims, 13 Drawing Sheets

(56) References Cited

U.S. PATENT DOCUMENTS

| | | | |
|---|---|---|---|
| 2011/0134805 A1* | 6/2011 | Cho | H04N 1/00307 |
| | | | 370/259 |
| 2011/0171923 A1* | 7/2011 | Daly | H04L 12/12 |
| | | | 455/404.1 |
| 2013/0217376 A1* | 8/2013 | Behairy | H04L 67/303 |
| | | | 455/418 |
| 2013/0321625 A1* | 12/2013 | Yanagihara | H04R 1/32 |
| | | | 348/143 |
| 2014/0047556 A1* | 2/2014 | Davis | G06F 21/606 |
| | | | 726/28 |
| 2014/0157359 A1* | 6/2014 | Ingrassia, Jr. | H04W 12/08 |
| | | | 726/1 |
| 2015/0304169 A1* | 10/2015 | Milman | H04L 63/0209 |
| | | | 709/220 |
| 2015/0310444 A1* | 10/2015 | Chen | H04L 41/0823 |
| | | | 340/568.1 |
| 2015/0316262 A1* | 11/2015 | Immer | F23N 5/00 |
| | | | 431/2 |
| 2016/0034696 A1* | 2/2016 | Jooste | H04L 63/10 |
| | | | 726/1 |
| 2017/0086019 A1* | 3/2017 | Rabinowitz | H04W 12/08 |
| 2018/0139575 A1* | 5/2018 | Rabinowitz | H04W 4/021 |
| 2019/0139159 A1* | 5/2019 | Sarker | H02J 3/008 |
| 2019/0207267 A1* | 7/2019 | Vickery | B60L 58/13 |
| 2019/0207268 A1* | 7/2019 | Lai | B60L 53/68 |
| 2019/0207397 A1* | 7/2019 | Lai | G01R 31/3842 |
| 2019/0209022 A1* | 7/2019 | Sobol | A61B 5/1112 |
| 2019/0320286 A1* | 10/2019 | Rabinowitz | H04W 4/025 |
| 2020/0196092 A1* | 6/2020 | Jones | G08B 25/08 |
| 2020/0201984 A1* | 6/2020 | Dhavali | G06F 21/52 |

* cited by examiner

WIRELESS DEVICE SECURITY SYSTEM

CROSS-REFERENCE TO RELATED APPLICATION

This application is a continuation of U.S. patent application Ser. No. 15/608,925, filed May 30, 2017, the disclosure of which is hereby incorporated herein by reference in its entirety.

TECHNICAL FIELD

The present description relates generally to a security system, including a multi-stage wireless device security system.

BACKGROUND

Retail stores may utilize various mechanisms to control their inventory of products, such as to prevent or deter theft of products. For example, electronic devices, such as phones, tablets, computers, etc., may be affixed to a surface of the store or physically tethered to prevent unauthorized removal of the electronic devices from the store. The electronic devices may also be affixed with a tag, such as a magnetic tag, that may cause a loud audio alarm if detected by large full-body magnet detectors located at the exit of the store. Alternatively, clothing or shoes may be affixed with a mechanism that will damage the clothes or shoes, such as with ink, if the mechanism is removed from the clothing or shoes without a special tool (that may be unique to the store).

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
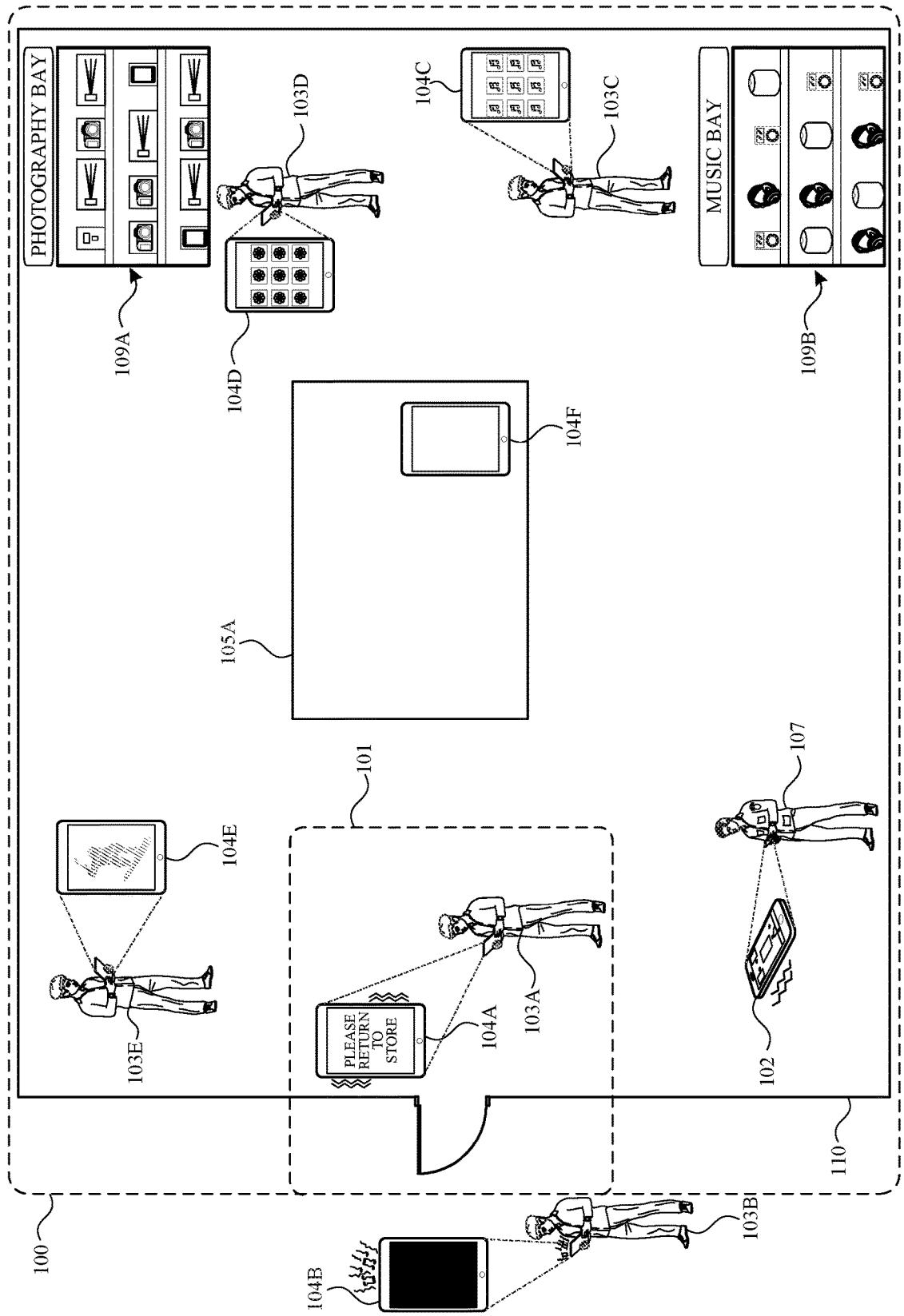
FIGS. 1-2 illustrate an example security area of a wireless device security system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Sales may increase at retail stores when shoppers are allowed to test one or more products in the retail stores before buying them. For example, a retail store may allow shoppers to test portable electronic devices, such as phones, tablets, watches, cameras, etc., before buying these devices. However, a shopper may not be able to fully test all the features of a portable electronic device if the portable electronic device is physically affixed to a surface or physically tethered. For example, a potential buyer may want to try taking pictures with a camera under multiple different lighting conditions, see whether a particular device fits in their bag/purse and/or how the device feels in their pocket, and the like. Furthermore, since portable electronic devices are often expensive products, it may not be desirable to affix a mechanism to a portable electronic device that will permanently disfigure or otherwise damage the portable electronic device. In addition, the presence of large body-sized magnetic sensors at the exit of a store may be discomforting to shoppers and may not be sufficient to prevent theft of the products.

Similarly, some entities, such as schools, companies, libraries, etc. may provide an inventory of portable electronic devices, such as tablets, to be used by students, workers, library members, etc., while in designated areas, such as within the schools, offices, libraries, etc. These entities may also benefit from a system that can effectively control their inventory of portable electronic devices without having to permanently tether or affix the portable electronic devices.

In the subject wireless device security system, a security area is established for an entity, such as a store, a school, a company, etc. The security area may be, for example, the physical area encompassed by the store, the school, an office environment, etc. The electronic devices owned by, and/or in possession of, the entity may be referred to as inventory electronic devices and may be placed in the security area for use without being physically tethered. The subject system monitors the locations of the inventory electronic devices with respect to the security area and provides the monitored locations to an administrator electronic device for display When the wireless device security system determines that one of the inventory electronic devices is being moved towards a boundary of the security area, or has passed the boundary of the security area, the wireless device security system sends an alert to the administrator electronic device, such as a device being carried by a store employee, indicating the same. If the wireless device security system determines that one of the inventory electronic devices has been outside of the security area for a threshold amount of time, such as two minutes, the wireless device security system may prevent the inventory electronic device from accessing server-side services, such as an activation service, until the inventory electronic device is returned to the security area.

Furthermore, the individual inventory electronic devices may also monitor their own locations and determine when they are being moved towards a boundary of the security area, or when moving to another area. When an inventory electronic device determines that it is being moved towards a boundary of the security area, the inventory electronic device may provide an alert output to notify specifically the person carrying the inventory electronic device that they are approaching a boundary of the security area. If the inventory electronic device determines that it has been taken outside of the security area without authorization, the electronic device may provide a disturbance output to attempt to notify any person in the proximate area that the inventory electronic device has been taken outside of the security area without authorization. While outside of the security area, the inventory electronic device may ignore all or some user input, such as by disabling hardware buttons, disabling touch inputs, etc. If the inventory electronic device is not returned to the security area within a threshold amount of time, the inventory electronic device may attempt to transmit a distress message with its location, such as over an open Wi-Fi network, via a cellular connection, via Bluetooth discovery messages, and the like.

In one or more implementations, the inventory electronic devices may be associated with a particular 'home' location which may be a location where the electronic device is presented to users for interaction, for example. As an inventory electronic device is moved further from its home location, the display of the inventory electronic device may adaptively blur, the blurring becoming more intense the further that the inventory electronic device is moved from its home location. As the inventory electronic device is moved closer to its home location, the blurring may adaptively clear until the display returns to its normal state, e.g. when the inventory electronic device is returned to within a threshold distance of its home location. In this manner, users interacting with the inventory electronic device may be encouraged to keep the inventory electronic device close to its home location.

The subject system may also be used to determine when the inventory electronic devices have been carried near certain locations within the designated area, such as near a feature bay of a retail store. Feature bays may be areas of a store that are dedicated to particular topics, such as photography, art, music, etc. The feature bays may include displays and/or products that are associated with the corresponding topic. Accordingly, when an inventory electronic device is moved near a feature bay, the display of the inventory electronic device may adaptively change to present the user with information and/or applications that are associated with the feature bay. For example, if the inventory electronic device is carried near a photography bay, the display of the electronic device may adaptively change to display photography information and/or photography applications to the user.

Accordingly, the subject system allows entities such as stores, schools, workplaces, etc., to provide portable electronic devices for general use within a designated area without needing physical tethers or other intrusive security mechanisms to ensure that the portable electronic devices are not removed from the designated area. The subject system also provides mechanisms to encourage users to keep inventory electronic devices near their home location, while also adaptively providing relevant information and/or applications to users as they carry an inventory electronic device throughout the designated area, e.g. within a store, school, etc.

FIG. 1 illustrates an example security area 100 of a wireless device security system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The security area 100 may be established by an entity implementing the subject wireless device security system, such as a retail store, a school, a company, a hotel, a cruise ship, a sports stadium, a museum, etc. The security area 100 may encompass all or part of one or more structures 110, such as one or more retail store buildings, one or more school buildings, one or more office buildings, etc. In FIG. 1, the structure 110 is illustrated as a retail store. The retail store may provide one or more inventory electronic devices 104A-F for users 103A-E to interact with so that the users 103A-E can decide whether to purchase one of the inventory electronic devices 104A-F. The inventory electronic devices 104A-F may be, for example, tablets, phones, watches, laptops, etc.

The inventory electronic devices 104A-F may initially be presented to the users 103A-E as resting, without any tethering, on a table 105A which may be referred to as the home location for the inventory electronic devices 104A-F. However, the inventory electronic devices 104A-F may be picked up and carried around the retail store by the users 103A-E, such as to interact with various features of the inventory electronic devices 104A-F. In this regard, the retail store may include one or more areas or bays 109A-B that may each be associated with a particular topic that may be of interest to the users 103A-E and/or may relate to the inventory electronic devices 104A-F. For example, in FIG. 1 the retail store includes a photography bay 109A and a music bay 109B.

When the users 103A-E carry the inventory electronic devices 104A-F near one of the bays 109A-B, the displays of the inventory electronic devices 104A-F adaptively change to present information and/or applications relevant to the respective bays 109A-B. For example, in FIG. 1, the user 103D has carried the inventory electronic device 104D near the photography bay 109A, and responsive thereto the display of the inventory electronic device 104D has adaptively changed to present the user 103D with photography-related applications. Similarly, in FIG. 1, the user 103C has carried the inventory electronic device 104C near the music bay 109B and, responsive thereto, the display of the inventory electronic device 104C has adaptively changed to present the user 103C with music-related applications.

When the users 103C-D move the electronic devices 104C-D away from the bays 109A-B, the displays of the electronic devices 104C-D may adaptively change back to a default display, such as displaying a default set of applications.

Although the users 103A-E can carry the inventory electronic devices 104A-F around the retail store, e.g., to visit the bays 109A-B, the retail store may wish to have the inventory electronic devices 104A-F stay within a specified distance of their home location, e.g. the table 105A. Thus, in order to encourage the users 103A-E to keep the inventory electronic devices 104A-F within a specified distance of their home location, e.g. the table 105A, the displays of the inventory electronic devices 104A-F may adaptively blur, or otherwise become obfuscated, when the users 103A-E move the inventory electronic devices 104A-F more than a specified distance from their home location, e.g. the table 105A. As shown in FIG. 1, the user 103E has moved the inventory electronic device 104E more than the specified distance from the home location of the inventory electronic device 104E, e.g. the table 105A, and therefore the image displayed on the inventory electronic device 104E has started to adaptively blur.

The blurring may be intensified as the user 103E moves the inventory electronic device 104E further from its home location, e.g. the table 105A, and similarly, the blurring may adaptively begin to clear as the user 103E moves the inventory electronic device 104E closer to its home location, with the display returning to its normal state when the inventory electronic devices 104E is brought back within the specified distance of its home location, e.g. the table 105A. Examples of different blurring states are discussed further below with respect to FIG. 12.

Since the users 103A-E are able to carry the inventory electronic devices 104A-F throughout the retail store, the users 103A-E may intentionally or unintentionally carry the inventory electronic devices 104A-F out of the retail store, such as to their car and/or home. Accordingly, to prevent the users 103A-E from unintentionally carrying the inventory electronic devices 104A-F out of the retail store, the inventory electronic devices 104A-F may adaptively provide an alert to the users 103A-E responsive to the users 103A-E carrying the inventory electronic devices 104A-F near the exit of the retail store, which may be referred to as a security risk area 101. The alert may be, for example, a message displayed on the screen, a gentle vibration, a light auditory alert, and the like. The inventory electronic devices 104A-F may adaptively stop providing the alert to the users 103A-E when the inventory electronic devices 104A-F are brought back into the retail store away from the exit, e.g. out of the security risk area 101.

For example, in FIG. 1, the user 103A has carried the inventory electronic device 104A near the exit of the retail store, and the display of the inventory electronic device 104A adaptively displays an alert message as well as gently vibrating to alert the user 103A that they may be unintentionally removing the inventory electronic device 104A from the retail store. The display of the inventory electronic device 104A may also adaptively display an image of the user 103A that is currently being captured by the front facing camera on the inventory electronic device 104A, such as to discourage the user 103A from intentionally removing the inventory electronic device 104A from the retail store. The image may be displayed, for example, as a background of the display of the inventory electronic device 104A.

However, in FIG. 1, the user 103B may be intentionally removing the inventory electronic device 104B from the retail store, in which case the alert message and gentle vibration may be ineffective. Thus, when the inventory electronic device 104B is removed from the retail store by the user 103B, e.g. carried by the user 103B past the security area 100 of the retail store, the inventory electronic device 104B may begin vibrating more forcefully, as well as outputting a loud and disturbing audible alarm, such as a siren. Furthermore, as illustrated in FIG. 1, the display of the inventory electronic device 104B may adaptively change to become completely black (or powered off), and one or more buttons on the inventory electronic devices 104B may adaptively change to become unresponsive to the user 103B.

The audible alarm may stop after a period of time; however, the display of the inventory electronic device 104B may remain black, and the buttons may remain unresponsive, until the inventory electronic device 104B is returned to the retail store, e.g. within the security area 100 of the retail store. Responsive to the inventory electronic device 104B being returned to the retail store, the display may adaptively turn back on, the buttons may adaptively become responsive, and the audible alarm may stop, if it has not already. However, if the inventory electronic device 104B is not returned to the retail store within a certain amount of time, the inventory electronic device 104B may be automatically remotely deactivated such that the inventory electronic device 104B is no longer usable.

In order for the retail store to keep track of these various movements of the inventory electronic devices 104A-F, the retail store may employ one or more employees 107 that can use an administrator electronic device 102 to monitor the locations of the inventory electronic devices 104A-F. For example, the administrator electronic device 102 may display a virtual map of the retail store that shows the locations of each of the inventory electronic devices 104A-F relative to the retail store. Furthermore, the administrator electronic device 102 may provide an alert to the employee 107 when the inventory electronic device 104A is taken near the exit of the retail store and/or when the inventory electronic device 104B is removed from the retail store. The employee 107 may use the administrator electronic device 102 to remotely deactivate the inventory electronic device 104B, and/or the employee 107 may use the administrator electronic device 102 to request that a new inventory electronic device be provided from a stock room to replace the inventory electronic device 104B on the table 105A.

Figure 2:
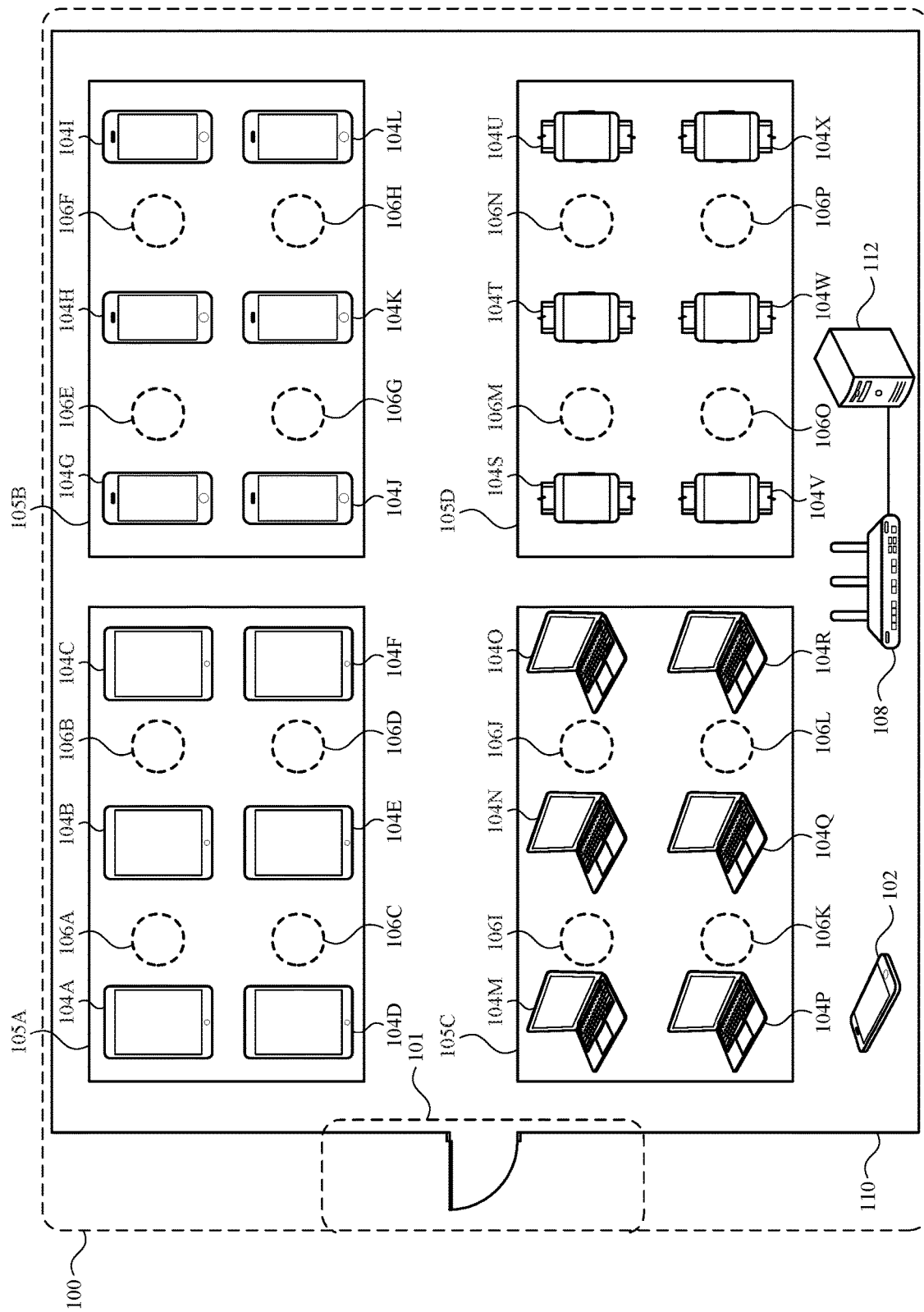

FIG. 2 illustrates the example security area 100 of a wireless device security system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The security area 100 may be established by an entity implementing the subject wireless device security system. The security area 100 may also be referred to as a security zone or a micro-security zone. In one or more implementations, the security area 100 may be an outdoor area and therefore may not encompass any physical structures. In one or more implementations, the security area 100 may include one or more security risk areas 101. The security risk area 101 may encompass all or part of a boundary of the security area 100, such as one or more entrances or exits of the one or more structures 110. In one or more implementations, the security risk area 101 may include several discontinuous discrete areas within the security area 100, such as bathrooms, dressing rooms, and the like.

The security area 100 may initially encompass the one or more electronic devices 104A-F and the administrator electronic device 102 of FIG. 1, as well as one or more inventory electronic devices 104G-X, an access point 108, one or more beacon electronic devices 106A-P, and a security server 112. The one or more inventory electronic devices 104A-X may be devices that are owned by, or under the possession of, the entity that established the security area 100, such as a retail store, school, company, etc. The one or more inventory electronic devices 104A-X may be provided by the entity for use by third parties, e.g. shoppers, students, workers, etc., within the security area 100 (but not outside of the security area 100). Accordingly, the security area 100 may effectively be any area that is designated by the entity for the use of the inventory electronic devices 104A-X.

In one or more implementations, the one or more inventory electronic devices 104A-X may initially be situated on the table 105A of FIG. 1 as well one or more tables 105B-D and the one or more beacon electronic devices 106A-P may be mounted to the undersides of the one or more tables 105A-D. However, the one or more beacon electronic devices 106A-P may be positioned anywhere within or around the security area 100 and/or the security area 100 may not include any beacon electronic devices 106A-P.

In one or more implementations, the one or more tables 105A-D may include wireless charging equipment such that the one or more inventory electronic devices 104A-X and/or the one or more beacon electronic devices 106A-P can be charged without wires/cords while proximate to the one or more tables 105A-D. Furthermore, the inventory electronic devices 104A-X may be situated on the one or more tables 105A-D without any physical wires, physical tethering, physical cords, or other physical security devices. Accordingly, the one or more electronic devices 104A-X may be physically removed from the tables 105A-D and may be used throughout the one or more structures 110 within the security area 100, and the one or more electronic devices 104A-X may be able to maintain their battery life substantially indefinitely when they are periodically or aperiodically brought within proximity of the wireless charging equipment, such as at night.

One or more of the electronic devices 104A-X and/or the administrator electronic device 102, may be, for example, a portable computing device such as a laptop computer, a smartphone, a peripheral device (e.g., a digital camera, headphones), a tablet device, a wearable device such as a watch, a band, and the like, or any other appropriate device that includes, for example, an internal power source, such as a battery and/or one or more wireless interfaces, such as wireless local area network (WLAN) radios, Wi-Fi radios, cellular radios, Bluetooth radios, Zigbee radios, near field communication (NFC) radios, and/or other wireless radios.

One or more of the beacon electronic devices 106A-P may be, for example, an electronic device with an internal power source, such as a battery, as well as one or more wireless interfaces, such as WLAN radios, Wi-Fi radios, cellular radios, Bluetooth radios, Zigbee radios, NFC radios, and/or other wireless radios. In one or more implementations, one or more of the beacon electronic devices 106A-P may be connected to an external power source, e.g. in lieu of an internal power source. The one or more beacon electronic devices 106A-P may transmit one or more beacon signals that may be received and used by the one or more inventory electronic devices 104A-X to determine (locally and/or with assistance from a server) their respective locations within (or outside of) the security area 100.

In one or more implementations, the inventory electronic devices 104A-X may determine their locations, for example, using an indoor positioning system that may be implemented in conjunction with the access point 108, and therefore the security area 100 may not include any beacon electronic devices 106A-P. In one or more implementations, the inventory electronic device 104A-X may determine their locations using a global positioning system (GPS), and/or any other location or positioning system.

The security server 112 may be communicatively coupled to one or more of the inventory electronic devices 104A-X and/or the administrator electronic device 102, such as via the access point 108, as is discussed further below with respect to the network environment of FIG. 3. However, all or part of the functions performed by the security server 112 may also be performed remotely, e.g. external to the security area 100, such as via a remote server and/or a cloud of computers. An example process of a security server 112 in the subject system is discussed further below with respect to FIG. 6.

In one or more implementations, the inventory electronic devices 104A-X may be used to calibrate the beacon electronic devices 106A-P. For example, the inventory electronic devices 104A-X and the beacon electronic devices 106A-P may be situated in specific locations known to the security server 112, and all of the electronic devices 104A-X, 106A-P may then be powered on. The inventory electronic devices 104A-X may each capture any beacon signals they receive from the beacon electronic devices 106A-P, and the inventory electronic devices 104A-X may report the beacon signals as well as the associated signal strengths to the security server 112. The security server 112 can determine calibration information for the beacon electronic devices 106A-P based on the received beacons signals and signal strengths in conjunction with the known locations of the electronic devices 104A-X, 106A-P.

In operation, the security server 112 provides real-time location information of the inventory electronic devices 104A-X to the administrator electronic device 102 and/or to one or more other devices. The administrator electronic device 102 may display the real-time location information on a user interface, such as to a retail store employee, a school/office administrator, and the like. In one or more implementations, the security server 112 may provide periodic or aperiodic updates to the administrator electronic device 102 with respect to the location information of the inventory electronic devices 104A-X. The security server 112 may also send a notification message to the administrator electronic device 102, e.g. separate from the user interface, when one or more of the inventory electronic devices 104A-X leaves the security area 100. The user interfaces may also provide additional details regarding the inventory electronic devices 104A-X, such as color, model, size, serial number, and the like. Example user interfaces that may be displayed on the administrator electronic device 102 are discussed further below with respect to FIGS. 7 and 8.

The inventory electronic devices 104A-X may be carried and used throughout the security area 100 without any physical wires, tethers, etc. The inventory electronic devices 104A-X may continuously monitor their own location with respect to the security area 100. If one or more of the inventory electronic devices 104A-X, such as the inventory electronic device 104A, determines that it is approaching or is within the security risk area 101, the inventory electronic device 104A may provide an alert output to alert the user handling the inventory electronic device 104A that they are nearing a boundary of the security area 100 or are otherwise within a security risk area 101. The alert output may include one or more of an audio output, a displayed message, a vibration, or the like. An example alert output message is discussed further below with respect to FIG. 9.

If the inventory electronic device 104A determines that it has been moved outside of the security area 100, the inventory electronic device 104A provides a disturbance output that is designed to alert other persons in proximity to the person carrying the inventory electronic device 104A that the inventory electronic device 104A has been removed from the security area 100. The disturbance output may include an audio output, e.g. a loud, continuous, and/or annoying noise, a displayed message, a vibration, or the like. The inventory electronic device 104A may continue outputting the disturbance output for a predetermined amount of time and/or until a remaining power supply falls below a threshold amount. In one or more implementations, the disturbance output may display an image of the user carrying the inventory electronic device 104A that is currently being captured by a back (or front) facing camera on the inventory electronic device 104A. Example disturbance output messages are discussed further below with respect to FIGS. 10 and 11.

In addition to providing the disturbance output, when the inventory electronic device 104A determines that it is located outside of the security area 100, the inventory electronic device 104A may disables all or some user input functionality. For example, the inventory electronic device 104A may disable all or some hardware buttons and/or the inventory electronic device 104A may disable all or some touch input. After providing the disturbance output for a given amount of time, the inventory electronic device 104A may power off the display, or may output a black screen on the display to give the appearance that the inventory electronic device 104A has been powered off (when in fact one or more components of the inventory electronic device 104A may still be powered on). If one or more distress message factors are met, the inventory electronic device 104A may attempt to transmit one or more distress messages to facilitate the recovery of the inventory electronic device 104A, such as by law enforcement authorities.

If the inventory electronic device 104A is returned to the security area 100, the inventory electronic device 104A reverts to its normal operating state, e.g. as if it were never removed from the security area 100. In one or more implementations, the inventory electronic device 104A may display a price and/or link for purchasing the inventory electronic device 104A upon being returned to the security area 100. An example inventory electronic device 104A is discussed further below with respect to FIG. 4, and an example process of an inventory electronic device 104A is discussed further below with respect to FIG. 5.

If the security server 112, determines that the inventory electronic device 104A has been outside of the security area 100 for a threshold amount of time, such as a few of seconds, a few of minutes, or any amount of time, the security server 112 may add the serial number of the inventory electronic device 104A to a global blacklist which may void and/or flag the warranty of the inventory electronic device 104A and/or may prevent the inventory electronic device 104A from accessing one or more server-side services, such as an activation service, which may effectively render the inventory electronic device 104A inoperable. However, if the security server 112 determines that the inventory electronic device 104A has been returned to the security area 100, the security server 112 removes the serial number of the inventory electronic device 104A from the global blacklist, such that the inventory electronic device 104A can revert to its normal operating state. Thus, the subject system provides standalone security mechanisms both client-side, e.g. on the electronic devices 104A-X, and server-side, e.g. on the security server 112.

For explanatory purposes, the subject system is discussed herein with respect to security applications. However, the subject system may also be used to create user experiences on the inventory electronic devices 104A-X based on location. For example different sub-areas within the security area 100 can be established and each sub-area may be associated with a different user experience on the inventory electronic devices 104A-X. For example, a retail store may have a sub-area of the store focused on a particular topic, such as music, art, photos, etc. When one of the inventory electronic devices 104A-X, such as the inventory electronic device 104A, is brought within the sub-area the applications displayed on the inventory electronic device 104A may change to reflect the topic associated with the sub-area, e.g. music applications, art applications, photo applications, etc. In one or more implementations, the sub-areas may be referred to as experience areas, experience zones, or micro-experience zones.

Similarly, in an educational environment, the different classrooms of a school may be associated with particular applications and/or access to particular applications may be prohibited in certain classrooms or areas of the school. For example, the inventory electronic device 104A may display math applications while in a math classroom and science applications while in a science classroom, and the inventory electronic device 104A may block access to all games/entertainment applications while in either classroom.

Figure 3:
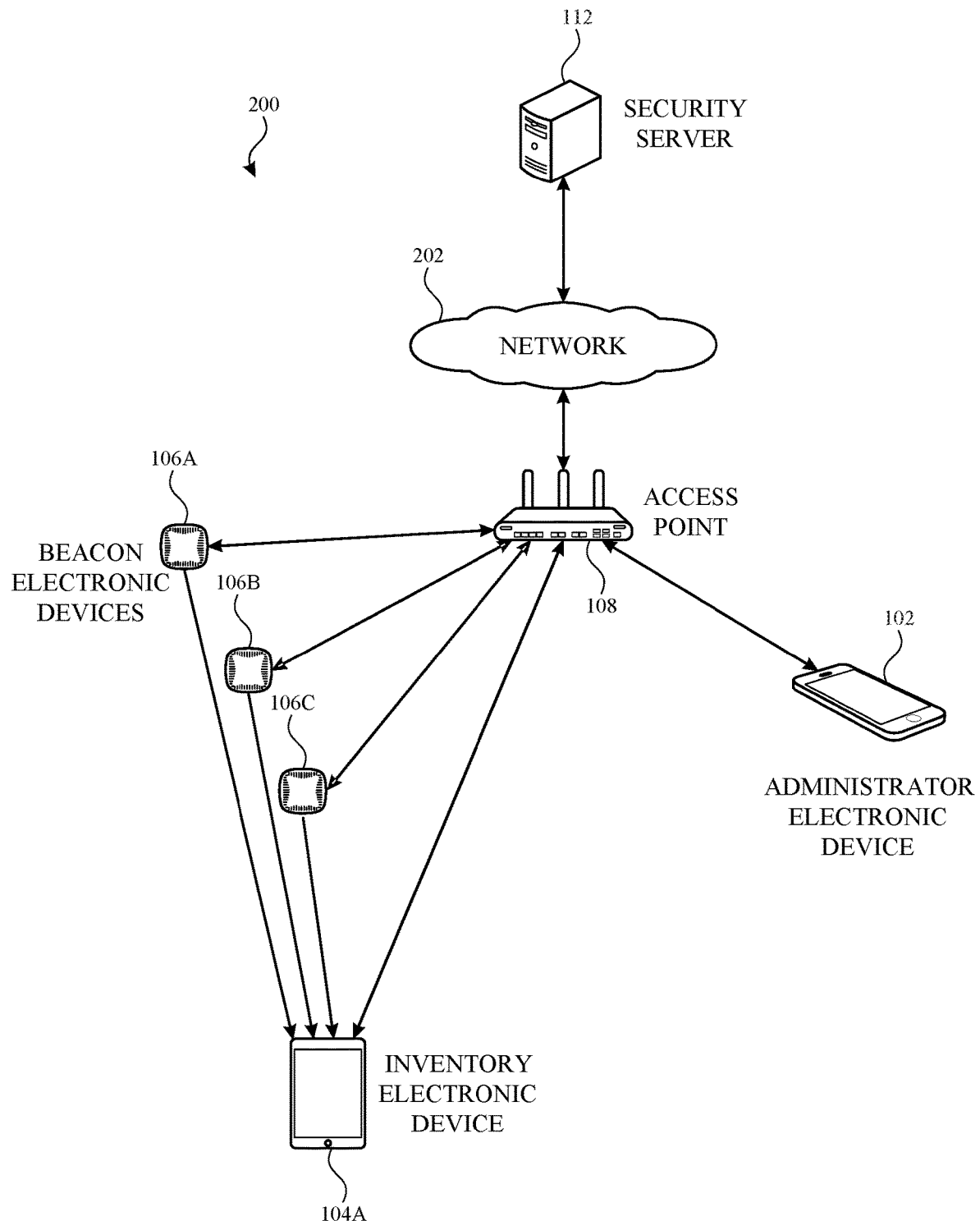
FIG. 3 illustrates an example network environment for a wireless device security system in accordance with one or more implementations.

FIG. 3 illustrates an example network environment 200 for a wireless device security system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 200 includes the administrator electronic device 102, the inventory electronic device 104A, the one or more beacon electronic devices 106A-C, the access point 108, the network 202 and the security server 112. For explanatory purposes, the network environment 200 is illustrated in FIG. 3 as including one administrator electronic device 102, one inventory electronic device 104, three beacon electronic devices 106A-C, one access point 108, and one security server 112; however, the network environment 200 may include any number of administrator electronic devices, inventory electronic devices, beacon electronic devices, access points, and/or security servers.

The access point 108 may provide a wired and/or wireless security area local area network (LAN) that is accessible to the inventory electronic devices 104A, the administrator electronic device 102, and/or the beacon electronic devices 106A-C when they are within the security area 100 of FIGS. 1-2. The security server 112 may be communicatively coupled to the access point 108 via a network 202 and/or the security server 112 may be directly linked (wired or wirelessly) to the access point 108. The security server 112 may include one or more servers that facilitate providing the subject wireless device security system. The one or more servers may be located all or in part within the security area 100 of FIGS. 1-2 and/or the one or more servers may be located all or in part outside of the security area 100 of FIGS. 1-2.

The one or more beacon electronic devices 106A-C may utilize a first communication protocol, such as a Wi-Fi communication protocol, to communicate with the security server 112, such as for configuration and/or calibration. The one or more beacon electronic devices 106A-C may utilize a second communication protocol, such as a Bluetooth Low Energy (BLE) communication protocol to transmit beacon signals or messages to the inventory electronic device 104A. For example, the beacon signals may be transmitted via BLE discovery or advertisement messages. In one or more implementations, the one or more beacon electronic devices 106A-C may communicate with the security server 112, and may transmit beacon messages to the inventory electronic device 104A, using the same communication protocol, such as the Wi-Fi communication protocol.

The inventory electronic device 104A may receive the beacon signals from the beacon electronic devices 106A-C and may determine its own location based on, for example, the signal strengths of the received beacon signals. For example, the inventory electronic device 104A may store information indicating the locations of the beacon electronic devices 106A-C and the inventory electronic device 104A may use the location information in conjunction with the signal strengths of the received beacon signals to determine its own location, e.g. through triangulation. The inventory electronic device 104A may then transmit its determined location to the security server 112 via the access point 108.

In one or more implementations, the inventory electronic device 104A may transmit information describing the received beacon signals and/or the signal strengths associated therewith to the security server 112. The security server 112 may determine the location of the inventory electronic device 104A based on the received information and the security server 112 may transmit the determined location to the inventory electronic device 104A. In one or more implementations, the inventory electronic device 104A and/or the access point 108 may determine the location of the inventory electronic device 104A based on transmissions between the inventory electronic device 104A and the access point 108, such as by utilizing one or more indoor positioning techniques (time of arrival estimation, etc.). Thus, in this instance the beacon electronic devices 106A-C may not be included in the network environment 200.

In one or more implementations, the security risk area 101 may be one or more areas in which the inventory electronic device 104A cannot receive any beacon signals from the beacon electronic devices 106A-C but can still maintain a connection with the access point 108. Similarly, the security area 100 may be the area in which the inventory electronic device 104A can establish or maintain a connection to the local area network provided by the access point 108. Accordingly, in one or more implementations, the security area 100 and the security risk area 101 may be defined by the physical placements of the one or more beacon electronic devices 106A-C and/or the access point 108 (and/or other access points) within the one or more structures 110, and/or by parameter settings/configurations on the one or more beacon electronic devices 106A-C and/or the access point 108, such as transmit signal strength settings, etc.

The administrator electronic device 102 may receive location information for the inventory electronic device 104A from the security server 112, such as via the access point 108. The administrator electronic device 102 may be located within the security area 100 and/or one or more other administrator electronic devices may be located outside of the security area 100.

Figure 4:
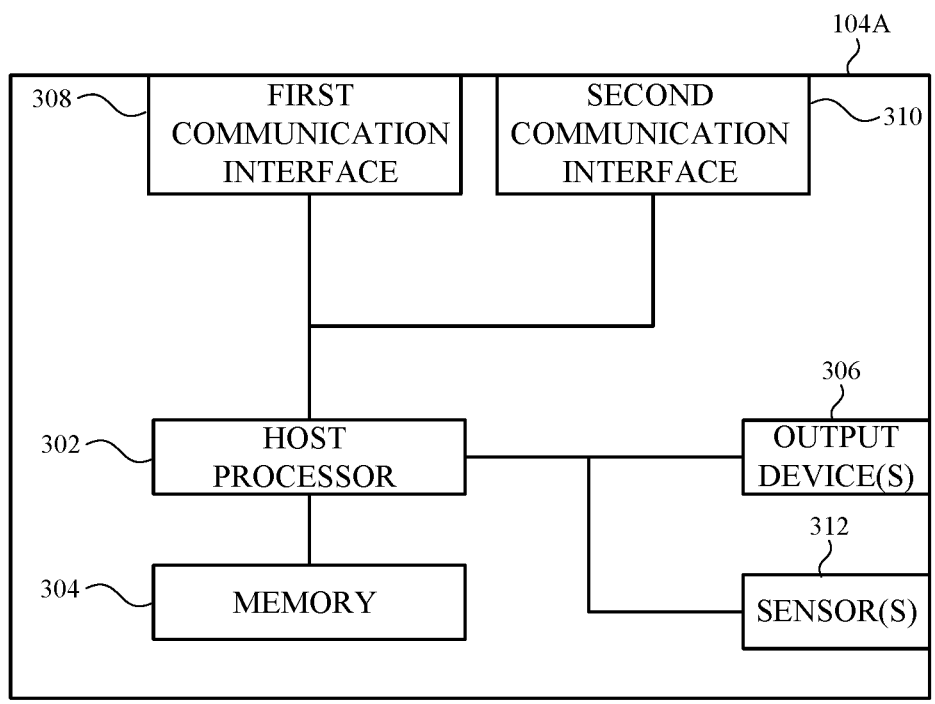
FIG. 4 illustrates an example inventory electronic device that may be used in a wireless device security system in accordance with one or more implementations.

FIG. 4 illustrates an example inventory electronic device 104A that may be used in a wireless device security system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example inventory electronic device 104A may be implemented by one or more the other inventory electronic devices 104B-X, the administrator electronic device 102, and/or one or more of the beacon electronic devices 106A-C.

The inventory electronic device 104A may include, among other components, a host processor 302, a memory 304, one or more output devices 306, a first communication interface 308, a second communication interface 310, and one or more sensors 312. The host processor 302, which may also be referred to as an application processor or a processor, may include suitable logic, circuitry, and/or code that enable processing data and/or controlling operations of the inventory electronic device 104A. In this regard, the host processor 302 may be enabled to provide control signals to various other components of the inventory electronic device 104A.

The host processor 302 may also control transfers of data between various portions of the inventory electronic device 104A. Additionally, the host processor 302 may enable implementation of an operating system or otherwise execute code to manage operations of the inventory electronic device 104A. The memory 304 may include suitable logic, circuitry, and/or code that enable storage of various types of information such as received data, generated data, code, and/or configuration information. The memory 304 may include, for example, random access memory (RAM), read-only memory (ROM), flash, and/or magnetic storage.

In one or more implementations, one or more aspects of the subject wireless device security system may be implemented on the inventory electronic device 104A via the operating system of the inventory electronic device 104A and/or via an application that is installed on the inventory electronic device 104A. For example, an application may be installed on the inventory electronic device 104A that is granted superuser or administrative privileges with respect to the operating system running on the inventory electronic device 104A. In this manner, the application is able to implement one or more aspects of the wireless device security system, such as providing the alert output and/or the disturbance output, as well as disabling the hardware buttons, touch input, and/or other hardware features. In one or more implementations, the aforementioned functionality provided by the application may be built into the operating system that is installed on the inventory electronic device 104A.

The first communication interface 308 may be used by the host processor 302 to communicate via a first communication protocol, such as BLE or NFC, and the second communication interface 310 may be used by the host processor 302 to communicate via a second communication protocol, such as Wi-Fi, cellular, Ethernet, or the like. The host processor 302 may utilize the first communication interface 308 to receive beacon signals from the one or more beacon electronic devices 106A-C and the host processor 302 may utilize the second communication interface 310 to establish/maintain a connection with the access point 108, e.g. to communicate with the security server 112.

In one or more implementations, the first communication interface 308 may be, may include, and/or may be communicatively coupled to a first radio frequency (RF) circuit, such as a Bluetooth circuit and/or an NFC circuit, and the second communication interface 310 may be, may include, and/or may be communicatively coupled to a second RF circuit, such as a WLAN circuit, a cellular RF circuit, or the like. In one or more implementations, the first communication interface 308 may include all or part of the second communication interface 310.

The one or more output devices 306 may include one or more devices that may be used to provide, for example, the alert output or the disturbance output. The one or more output devices may include one or more of a speaker, a display screen, a vibration mechanism, and the like. The one or more sensors 312 may include one or more sensors that may be used by the inventory electronic device 104A to obtain information that may facilitate the wireless device security system. The one or more sensors 312 may include a light sensor, a proximity sensor, a temperature sensor, an infrared light sensor, an accelerometer, a gyroscope, a compass, or generally any sensor that may provide information that may facilitate the subject wireless device security system.

In one or more implementations, one or more of the host processor 302, the memory 304, the one or more output device 306, the first communication interface 308, the second communication interface 310, one or more of the sensors 312, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 5:
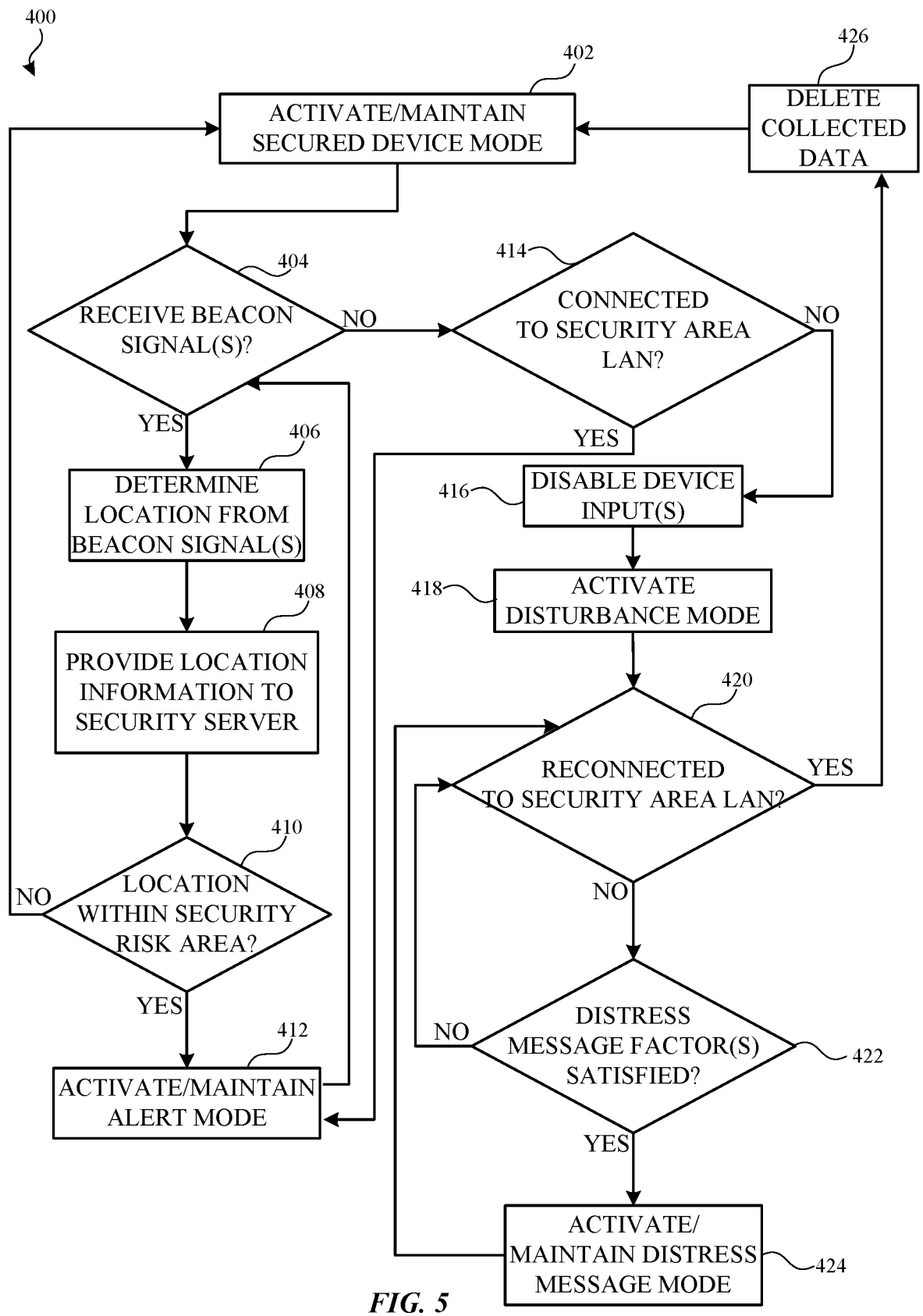
FIG. 5 illustrates a flow diagram of an example process of an inventory electronic device in a wireless device security system in accordance with one or more implementations.

FIG. 5 illustrates a flow diagram of an example process 400 of an inventory electronic device 104A in a wireless device security system in accordance with one or more implementations. For explanatory purposes, the process 400 is primarily described herein with reference to the inventory electronic device 104A of FIGS. 1-4. However, the process 400 is not limited to the inventory electronic device 104A of FIGS. 1-4, and one or more blocks (or operations) of the process 400 may be performed by one or more components or circuits of the inventory electronic device 104A. The inventory electronic device 104A is also presented as an exemplary device and the operations described herein may be performed by any suitable device, such as one or more of the inventory electronic devices 104B-X. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 may be initiated when a secured device mode is activated on the inventory electronic device 104A (402). For example, an operating system setting of the inventory electronic device 104A may be configured to activate the secured device mode and/or an application installed on the inventory electronic device 104A may be configured to activate the secured device mode. If the inventory electronic device 104A is not connected to the security area LAN via the access point 108, a connection may be established when the secured device mode is activated. Once the inventory electronic device 104A has entered the secured device mode, the inventory electronic device 104A begins searching for beacon signals, such as from the one or more beacon electronic devices 106A-C.

If the inventory electronic device 104A receives one or more beacon signals (404), the inventory electronic device 104A determines its location based at least in part on the received one or more beacon signals (406). For example, the inventory electronic device 104A may locally determine its location based on the received beacon signals. Alternatively, or in addition, the inventory electronic device 104A may transmit information describing the received beacon signals to the security server 112, the security server 112 may determine the location of the inventory electronic device 104A, and the security server 112 may provide the determined location to the inventory electronic device 104A.

Upon determining its location (406), the inventory electronic device 104A may provide location information describing its location to the security server 112, for example when the security server 112 did not participate in determining the location of the inventory electronic device 104A (408). The inventory electronic device 104A determines whether its location is within a security risk area 101 (410). For example, the inventory electronic device 104A may locally determine whether it is in a security risk area 101 and/or the inventory electronic device 104A may receive an indication from the security server 112 indicating that the inventory electronic device 104A is within a security risk area 101. In one or more implementations, the security risk areas may exist at any location where the inventory electronic device 104A cannot receive beacon signals. However, a security risk area may also be separately defined for any location within the security area 100 irrespective of whether beacon signals can be received.

If the inventory electronic device 104A determines that it is not within a security risk area (410), the inventory electronic device 104A maintains normal operation in the secured device mode (402). If the inventory electronic device 104A determines that it is within a security risk area 101 (410), the inventory electronic device 104A activates an alert mode (412). In the alert mode, the inventory electronic device 104A provides one or more alert outputs to attempt to alert the person using/carrying the inventory electronic device 104A that they are in a security risk area 101 or may be about to leave the security area 100 with the inventory electronic device 104A. The alert outputs may include displaying a message on the display screen of the inventory electronic device 104A, such as the message discussed further below with respect to FIG. 9, providing an audio output, such as a chime, or bell, and/or causing a vibration of the inventory electronic device 104A.

If the inventory electronic device 104A determines that it is moving through the security risk area 101 in a direction that will lead outside of the security area 100, the inventory electronic device 104A may adaptively modify the alert outputs in conjunction with the movement of the inventory electronic device 104A. For example, the provided audio output may get louder and the intensity of the vibration may get stronger as the inventory electronic device 104A gets closer to the boundary of the security area 100. In one or more implementations, the user interface on the display screen may become increasingly obfuscated and/or blurred as the inventory electronic device 104A approaches a boundary of the security area 100. In one or more implementations, the security server 112 may transmit an alert to the administrator electronic device 102 when the inventory electronic device 104A is moving towards, and/or has entered, the security risk area 101. Examples of different blurring states are discussed further below with respect to FIG. 12.

In one or more implementations, the alert mode may be implemented by the inventory electronic device 104A in stages that transition as the inventory electronic device 104A approaches the boundary of the security area 100, such as to minimize the disruption of the alert mode to other users. For example, as the inventory electronic device 104A approaches or enters the security risk area 101 the inventory electronic device 104A may begin to vibrate. As the inventory electronic device 104A continues to move through the security risk area 101 towards the boundary of the security area 100, and/or if the inventory electronic device 104A remains in the security risk area 101 for a threshold amount of time, the inventory electronic device 104A may begin to blur the display of the inventory electronic device 104A, whiten the display, or otherwise cause the render display difficult to view. The intensity of the blurring or whitening may increase as the inventory electronic device 104A approaches the boundary of the security area 100. Lastly, when the inventory electronic device 104A passes within a threshold distance of the boundary of the security area 100, the inventory electronic device 104A may output an audio alarm. In one or more implementations, the alert mode may include one or more additional stages and/or two or more of the stages may occur in parallel.

While in the alert mode (412), the inventory electronic device 104A continues to attempt to receive beacon signals from the beacon electronic devices 106A-C (404) in order to determine its location (406). In one or more implementations, the alert mode may be configurable, such as based on an expected or known theft rate associated with the security area 100. For example, when the security area 100 is associated with a high theft rate, the alert mode may be configured such that the inventory electronic device 104A determines a moment in time immediately prior to when it will be most likely removed from the security area 100, such as based on location information, changes in the strength of signals received from the access point 108, directional information, e.g. from the accelerometer, and/or other factors. In or around the time immediately prior to when it will be most likely removed from the security area 100 (and consequently disconnected from the access point 108), the inventory electronic device 104A may transmit information to the security server 112 describing the person who last handled the inventory electronic device 104A (and therefore most likely removed the inventory electronic device 104A from the security area 100). As is discussed further below, if the inventory electronic device 104A is returned to the security area 100, the information describing the person who last handled the inventory electronic device 104A may be immediately and automatically deleted from the security server 112 and the inventory electronic device 104A.

The information describing the person who last handled the inventory electronic device 104A may include an image of the last person to handle the inventory electronic device 104A, audio recorded around the time when the image of the person was captured, one or more facial recognition data points that may have been determinable from the image sensor (and/or a secondary image sensor) when the image was captured, and/or any other information that may be used to identify the person who most likely removed the inventory electronic device 104A from the security area 100. If the inventory electronic device 104A is not removed from the security area 100, the inventory electronic device 104A is returned to the security area 100, and/or a threshold amount of time passes, the information describing the person may be automatically deleted from the inventory electronic device 104A and the security server 112.

If the inventory electronic device 104A determines that its location has moved outside of the security risk area 101 but inside of the security area 100 (410), the inventory electronic device 104A reactivates the secured device mode to resume normal operation within the security area 100. If the inventory electronic device 104A determines that it is no longer receiving any beacon signals (404), the inventory electronic device 104A determines whether it is still connected to the security area LAN provided by the access point 108 (414). If the inventory electronic device 104A determines that it is still connected to the security area LAN (414) but is not receiving any beacon signals (404), the inventory electronic device 104A determines that it may be in a security risk area 101, and activates the alert mode (412).

If the inventory electronic device 104A determines that it is no longer connected to the security area LAN (414), the inventory electronic device 104A disables one or more device inputs, such as hardware input buttons or touch input mechanisms (416), and the inventory electronic device 104A activates a disturbance mode (418). By disabling the hardware input buttons and/or touch input, the inventory electronic device 104A ignores, or is nonresponsive to, some or all inputs provided by the user. In one or more implementations, the inventory electronic device 104A may wait a threshold amount of time before disabling the device inputs (416) and activating the disturbance mode (418).

Since the beacon electronic devices 106A-P may have internal power supplies, such as batteries, and since the inventory electronic device 104A does not enter the disturbance mode unless it is not receiving beacon signals (404) and is not connected to the security area LAN (414), the subject system will still function properly during a power outage since the beacon electronic devices 106A-P would still be able to transmit beacon signals by utilizing battery power, e.g. even if the access point 108 is not operating.

In the alert mode, the inventory electronic device 104A attempts to alert the person carrying the inventory electronic device 104A that they may be about to remove the inventory electronic device 104A from the security area 100. However, in the disturbance mode, the inventory electronic device 104A attempts to alert other users in the vicinity of the user who is carrying the inventory electronic device 104A, in addition to the user that is carrying the inventory electronic device 104A, that the inventory electronic device 104A has been removed from the security area 100. Accordingly, the outputs provided in the disturbance mode may be more disturbing, e.g. louder, greater intensity, than the outputs provided in the alert mode.

For example, in the disturbance mode, the inventory electronic device 104A may continuously output a loud and/or annoying noise for a predetermined amount of time after the inventory electronic device 104A has been removed from the security area 100. However, in order to conserve power, after a predetermined amount of time the inventory electronic device 104A may enter a low power disturbance mode. In the low power disturbance mode, the inventory electronic device 104A may temporarily stop the audio output and may shut off the display screen to conserve power and give the appearance that the inventory electronic device 104A is not powered on. The inventory electronic device 104A may then implement a more strategic approach to disturbing or alerting nearby persons.

For example, while in the disturbance mode the inventory electronic device 104A may continuously record and store video and/or audio of its surrounding, as well as recording any other inputs that can be received by the sensors or interfaces on the inventory electronic device 104A, e.g. temperature, direction, acceleration, service set identifiers (SSIDs) of access points, GPS coordinates, and the like. The inventory electronic device 104A may process the recorded audio with voice recognition techniques to identify the voice of the person who most likely removed the inventory electronic device 104A from the security area 100. The inventory electronic device 104A may then wait until it detects the voice of another person and, when the voice of another person is detected, the inventory electronic device 104A may resume outputting the loud audio output as well as displaying a visibly impactful message, e.g. a flashing message, indicating that the inventory electronic device 104A was removed from the security area 100.

Further while in the disturbance mode, the inventory electronic device 104A may determine whether it is proximate to any other inventory electronic devices 104B-X that were removed from the security area 100 and/or from another security area. For example, the inventory electronic device 104A may broadcast advertisement/beacon messages and/or may respond to advertisement/beacon messages from other proximate inventory electronic devices 104B-X. The messages may indicate that the inventory electronic device 104A is in the disturbance mode and/or the messages may otherwise indicate that the inventory electronic device 104A was been removed from the security area 100. If one or more other inventory electronic devices 104B-X, such as the inventory electronic devices 104B-C, are identified as being proximate to the inventory electronic device 104A, the inventory electronic devices 104A-C may collaborate with one another in the disturbance mode, as well as share the data that the inventory electronic devices 104A-C have already individually collected.

For example, the inventory electronic devices 104A-C may take turns recording audio, video, SSIDs, GPS coordinates, sensor inputs, and the like, as well as take turns outputting the loud audio output and/or other outputs, and taking turns searching for the security area LAN. In one or more implementations, the inventory electronic devices 104A-C may determine their collective battery life and may develop a schedule for performing the various disturbance mode tasks in a manner that maximizes the collective battery life of the inventory electronic devices 104A-C, and/or that allows one of the inventory electronic devices 104A-C that is capable of cellular data network communications to extend its battery life the longest.

If, while in the disturbance mode, the inventory electronic device 104A determines that it has reconnected to the security area LAN (420), the inventory electronic device 104A automatically deletes all data that was collected during the disturbance mode (426) and reactivates the secured device mode to resume normal operation in the security area 100 (402). If, while in disturbance mode, the inventory electronic device 104A is not reconnected to the security area LAN (420), the inventory electronic device 104A determines whether one or more distress message factors have been satisfied (422).

The one or more distress message factors may include, for example, the amount of power remaining for the inventory electronic device 104A, or the collective amount of power remaining in the instance of a group of inventory electronic devices 104A-C, the amount of time that the inventory electronic device 104A has been removed from the security area 100, the value of the inventory electronic device 104A and/or the combined value of a group of inventory electronic devices 104A-C, detecting that the inventory electronic device 104A is heading towards another country and/or heading to a location that will make retrieval of the inventory electronic device 104A more difficult, and the like. For example, the one or more distress factors may be satisfied when the power supply or collective power supply falls below a threshold level, when the amount of time that the inventory electronic device 104A has been removed from the security area 100 exceeds a threshold amount of time, when the value or combined value exceeds a threshold amount, and/or when the inventory electronic device 104A determines that it is imminently headed to another country or some location that will make retrieval more difficult.

If the inventory electronic device 104A determines that the one or more distress factors are not satisfied (422), the inventory electronic device 104A continues to try to reconnect to the security area LAN (420). If the inventory electronic device 104A determines that the one or more distress factors are satisfied (422), the inventory electronic device 104A activates a distress message mode, or an "SOS" mode (424). In the distress message mode, the inventory electronic device 104A attempts to transmit a distress message indicating that it has been removed from the security area 100 and its current location, to one or more of the security server 112, the administrator electronic device 102, and/or one or more other servers, such as law enforcement servers.

If the inventory electronic device 104A (and/or another inventory electronic device 104A) is capable of transmitting data over a cellular network, for example when the inventory electronic device 104A includes an activated subscriber identification module (SIM) card, the inventory electronic device 104A may transmit the distress message over the cellar network. The distress message may include, for example, the current location of the inventory electronic device 104A, e.g., determined based on a global positioning system (GPS) and/or based on measurements taken by the accelerometer from the last known location of the inventory electronic device 104A within the security area 100.

The distress message may further include information identifying the inventory electronic device 104A (and any other inventory electronic devices proximate to the inventory electronic device 104A) as well as the security area 100 from which the inventory electronic device 104A was removed. In one or more implementations, the distress message may further include any identifying information that has been recorded with respect to the person who most likely removed the inventory electronic device 104A from the security area. The identifying information may include, for example, an image of the person, video recording of the person, audio recordings of the person, facial recognition data of the person, and/or any other identifying information that may have been collected by the inventory electronic device 104A (and/or any other inventory electronic devices proximate to the inventory electronic device 104A). In one or more implementations, if the inventory electronic device 104A is returned to the security area 100 after a distress message has been transmitted to the security server 112, the distress message, as well as any stored identifying information, is automatically and immediately deleted from the security server 112 and the inventory electronic device 104A.

If the inventory electronic device 104A does not have the capability of communicating over a cellular network, the inventory electronic device 104A may search for an open wireless network. If the inventory electronic device 104A finds an open wireless network, the inventory electronic device 104A may connect to the wireless network, establish a secure connection, such as with the security server 112, and may transmit a distress message to the security server 112 over the secure connection. If the inventory electronic device 104A cannot find an open wireless network to connect to, the inventory electronic device 104A may broadcast the distress message as a discovery or advertisement message, such as over Wi-Fi or BLE. The distress message may include information identifying the inventory electronic device 104A, such as a media access control (MAC) address of the inventory electronic device 104A, and may also include information identifying the location of the inventory electronic device 104A, such as GPS coordinates.

Since the advertisement message can be transmitted and received without any connection to a network and without being paired to any other devices, any electronic devices that are proximate to the inventory electronic device 104A, and have Wi-Fi and/or BLE enabled, can receive the distress messages from the inventory electronic device 104A. If the devices receiving the distress messages have access to the Internet, and/or are communicatively coupled to a device that has access to the Internet, the devices may forward the distress message from the inventory electronic device 104A to a centralized server, such as a law enforcement server and/or the security server 112.

In one or more implementations, the inventory electronic device 104A may transmit a standard-compliant advertising packet that includes its MAC address as the advertisement address. In one or more implementations, the advertisement message may have a specific bit set to indicate that it is a distress message. Proximate devices that are manufactured by the same manufacturer as the inventory electronic device 104A and/or are compliant with a distress message specification, may receive the distress message. If a receiving device has access to the Internet, the receiving device may perform a search to determine if the MAC address of the inventory electronic device 104A has been added to a blacklist indicating that the inventory electronic device 104A has been removed from the security area 100.

If the receiving device receives a response indicating that the MAC address of the inventory electronic device 104A is on the blacklist, the receiving device may anonymously transmit its own location (which is proximate to the inventory electronic device 104A) in association with the inventory electronic device 104A. The location may then be provided to law enforcement servers and/or the security server 112. Thus, even if the inventory electronic device 104A does not have access to a cellular data network and cannot access an open wireless network, the inventory electronic device 104A may still be able to successfully transmit a distress message using Wi-Fi and/or BLE discovery/advertisement messages. In one or more implementations, users may be given the option to opt-out of the distress message forwarding system with respect to the electronic devices that they own.

In one or more implementations, if the inventory electronic device 104A has cellular network capabilities but does not have an activated SIM card, and if certain higher threshold distress message factors are met (e.g., the value or combined value exceeds a larger threshold and/or the inventory electronic device 104A is imminently heading out of the country), the inventory electronic device 104A may initiate a call with an emergency service that is accessible without a SIM card, such as a 911 call in the United States. When an operator answers the call, the inventory electronic device 104A may use text-to-speech technology to describe its situation and current location to the operator. The inventory electronic device 104A may also provide any information that has been determined about the person who has most likely removed the inventory electronic device 104A from the security area 100, such as the person's name, address, an audio recording of the person talking, and/or any other information that can be conveyed over a phone call.

Figure 6:
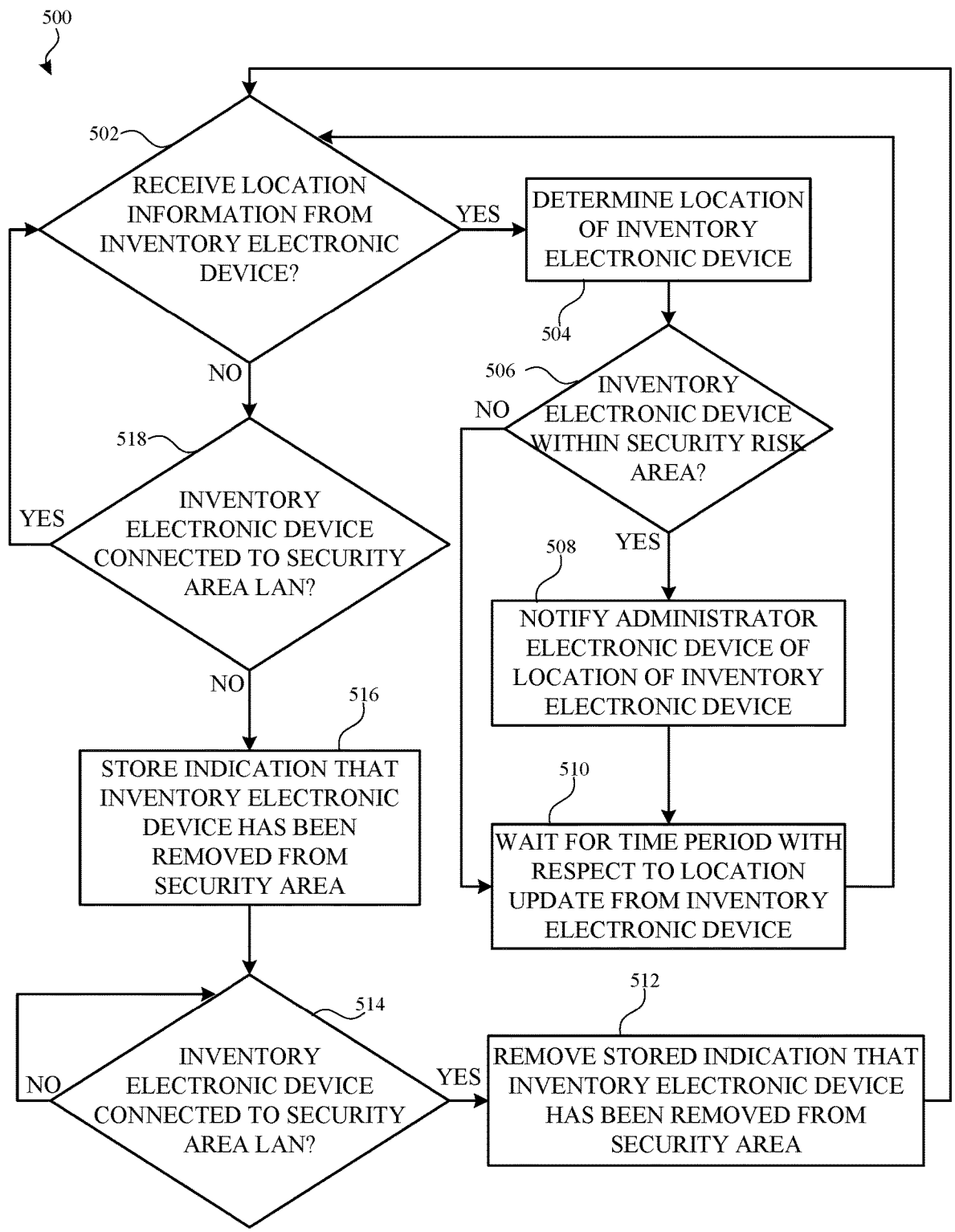
FIG. 6 illustrates a flow diagram of an example process of a security server in accordance with one or more implementations.

FIG. 6 illustrates a flow diagram of an example process 500 of a security server 112 in accordance with one or more implementations. For explanatory purposes, the process 500 is primarily described herein with reference to the security server 112 of FIGS. 2-3. However, the process 500 is not limited to the security server 112 of FIGS. 2-3, and one or more blocks (or operations) of the process 500 may be performed by one or more other components or chips of the security server 112. The security server 112 also is presented as an exemplary device and the operations described herein may be performed by any suitable device or devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 may be initiated when the wireless device security system is activated on the security server 112 for a registered set of inventory electronic devices 104A-X. Although the process 500 may be simultaneously performed for each of the inventory electronic devices 104A-X, for explanatory purposes the process 500 is described with reference to the single inventory electronic device 104A. With respect to the inventory electronic device 104A, the security server 112 determines whether location information has been received from the inventory electronic device 104A (502). If no location information has been received from the inventory electronic device 104A for a threshold amount of time, the security server 112 determines whether the inventory electronic device 104A is still connected to the security area LAN (518). For example, the security server 112 may query the access point 108 to determine whether the inventory electronic device 104A is still connected to the security area LAN.

If the security server 112 determines that the inventory electronic device 104A is no longer connected to the security area LAN (518), the security server 112 stores an indication that the inventory electronic device 104A has been removed from the security area 100 (516). In one or more implementations, the security server 112 may wait a threshold amount of time before storing the indication, and/or the security server 112 may transmit a notification to the administrator electronic device 102 indicating that the inventory electronic device 104A has been removed from the security area 100, and the security server 112 may wait for authorization from the administrator electronic device 102 before storing the indication.

The indication may be an entry of an identifier of the inventory electronic device 104A, such as a serial number, on a blacklist that prevents the inventory electronic device 104A from accessing one or more server-side services, such as an activation service, and/or that tags or invalidates the warranty of the inventory electronic device 104A. Accordingly, even if the operating system of the inventory electronic device 104A were replaced, a user of the inventory electronic device 104A would not be able to activate the inventory electronic device 104A, thereby effectively rendering the inventory electronic device 104A inoperable.

The security server 112 may continue to determine whether the inventory electronic device 104A has reconnected to the security area LAN and therefore is back within the security area 100 (514). If the security server 112 determines that the inventory electronic device 104A has reconnected to the security area LAN (514), the security server 112 removes the stored indication that the inventory electronic device 104A has been removed from the security area 100 (512). Thus, in one or more implementations, the inventory electronic device 104A can immediately revert to normal operation including accessing server-side services upon returning to the security area 100.

When the security server 112 receives location information from the inventory electronic device 104A (502), the security server 112 determines the location of the inventory electronic device 104A within the security area 100 (504). For example, the inventory electronic device 104A may transmit an indication of the beacon signals that it has received as well as the signal strengths of the beacon signals. The security server 112 may correlate the beacon signal strengths to the known locations of the corresponding beacon electronic devices 106A-C to determine the location of the inventory electronic device 104A. In one or more implementations, the inventory electronic device 104A may transmit its location to the security server 112 (instead of the information describing the beacon signals) in which case the security server 112 may utilize the received location for the inventory electronic device 104A.

If the security server 112 determines, based on the location of the inventory electronic device 104A, that the inventory electronic device 104A is within a security risk area (506), the security server 112 notifies the administrator electronic device 102 of the location of the inventory electronic device 104A, and indicates that the inventory electronic device 104A is in the security risk area 101 (508). The security server 112 then waits for a time period to receive the next location update from the inventory electronic device 104A (510) and then determines whether it has received location information from the inventory electronic device 104A (502) and repeats the steps (504)-(518).

Figure 7:
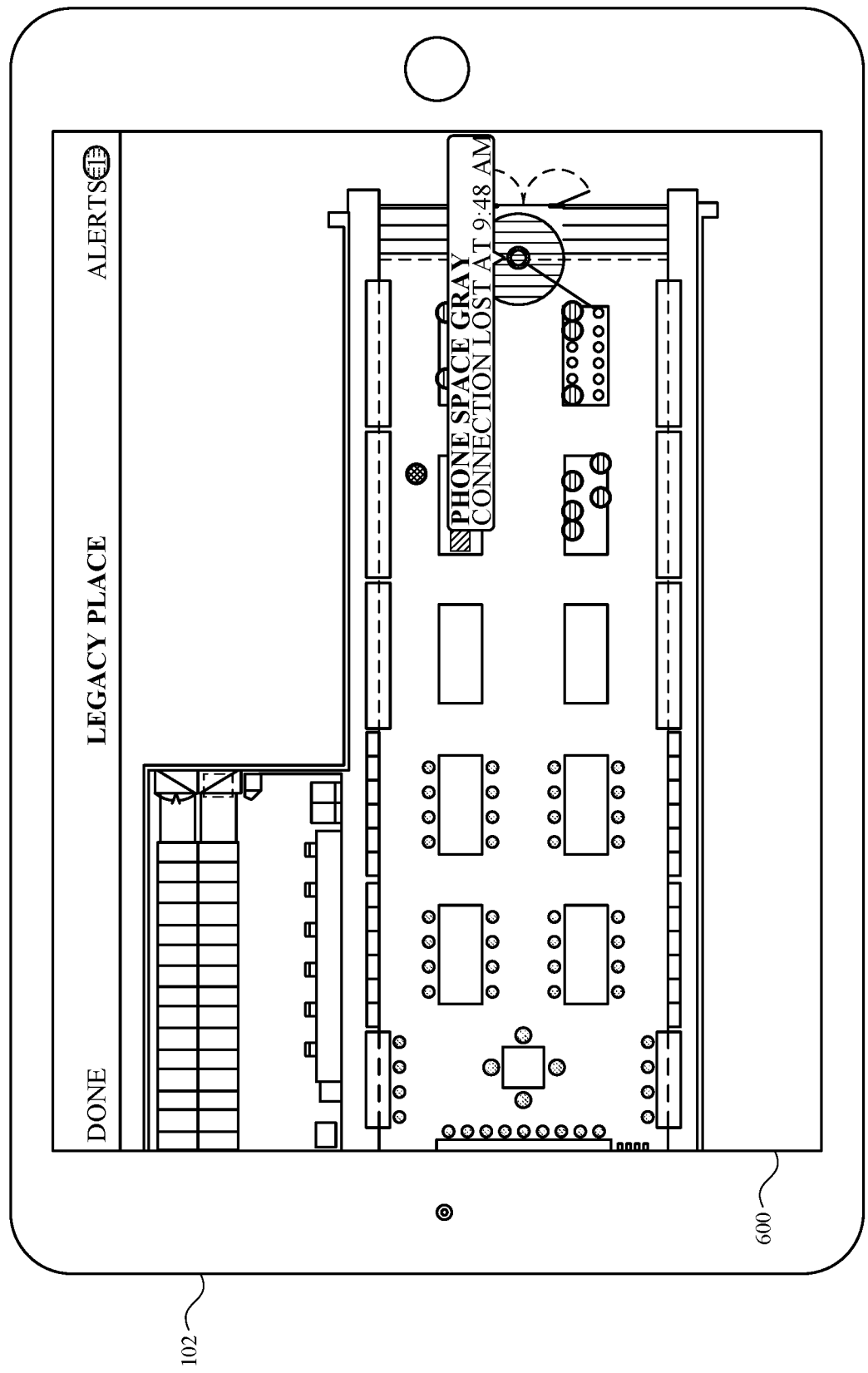
FIG. 7 illustrates an example administrator electronic device displaying an example administrator user interface of a wireless device security system in accordance with one or more implementations.

FIG. 7 illustrates an example administrator electronic device 102 displaying an example administrator user interface 600 of a wireless device security system in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The administrator user interface 600 illustrates circles or dots that represent the locations of the various inventory electronic devices 104A-X. The circles or dots may be selectable to obtain additional information regarding the corresponding inventory electronic devices 104A-X. The circles or dots may have different colors or different shading to represent the current state of the inventory electronic devices 104A-X. For example, the inventory electronic devices 104A-X that have recently received beacon signals from the beacon electronic devices 106A-P and are currently connected to the security area LAN may be represented by a first color or shading, the inventory electronic devices 104A-X that have not recently received beacon signals but are connected to the security area LAN may be represented by a second color or shading, and the inventory electronic devices 104A-X that are not connected to the security area LAN and have not recently received beacon signals may be represented by a third color or shading.

Furthermore, as shown in the administrator user interface 600, when one of the inventory electronic devices 104A-X, such as the inventory electronic device 104A, leaves the security area 100, the user interface displays a description of the inventory electronic device 104A as well as providing an indication of the original location of the inventory electronic device 104A within the security area 100.

Figure 8:
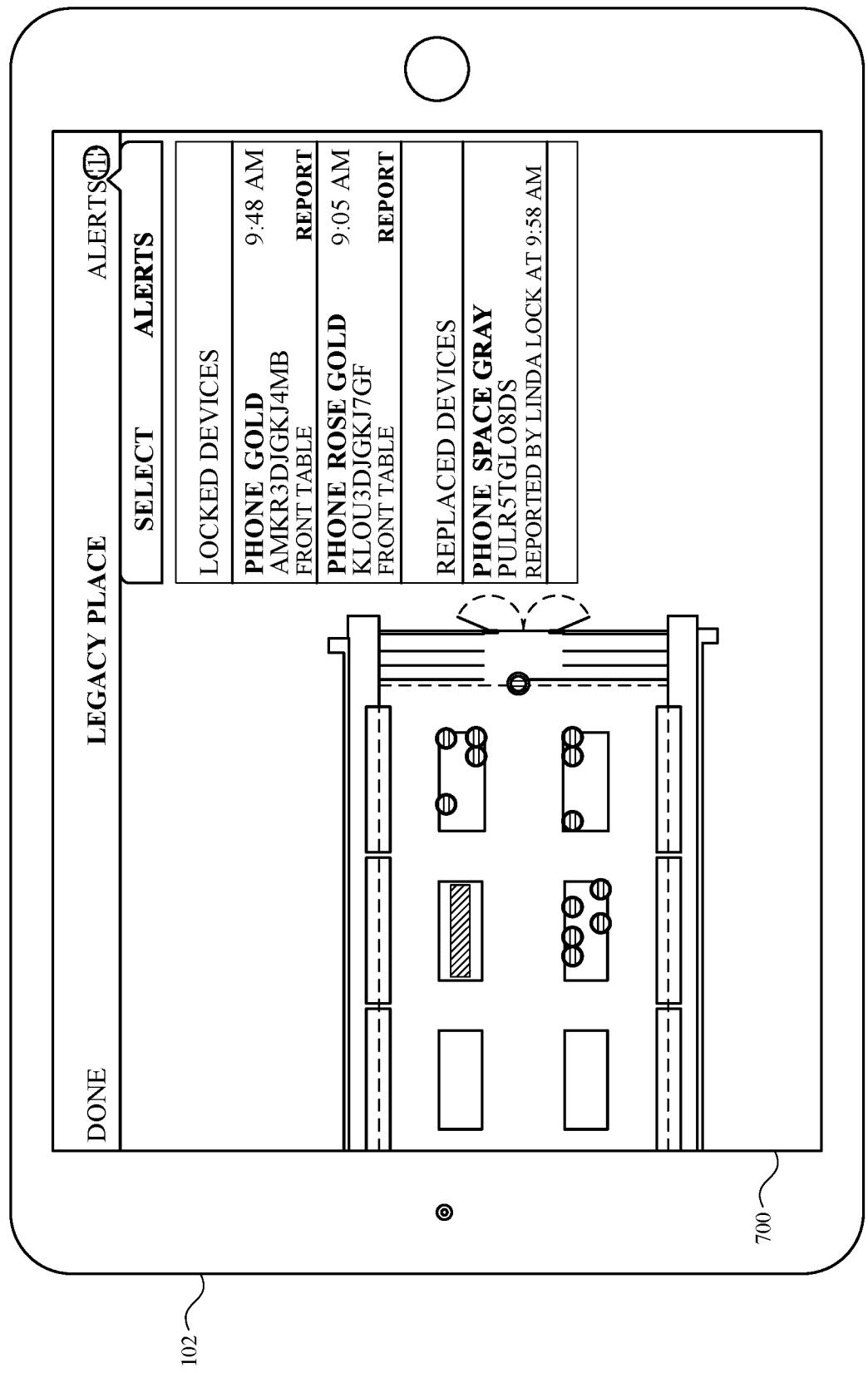
FIG. 8 illustrates an example administrator electronic device displaying an example administrator user interface of a wireless device security system in accordance with one or more implementations.

FIG. 8 illustrates an example administrator electronic device 102 displaying an example administrator user interface 700 of a wireless device security system in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The administrator user interface 700 displays groups of the inventory electronic devices 104A-X that are grouped based on the state of the inventory electronic devices 104A-X. The administrator user interface 700 further provides information regarding one or more of the inventory electronic devices 104A-X, such as the inventory electronic device 104A, that have certain states, such as a lost state, a locked state, etc. The information may include, for example, a description of the inventory electronic device 104A, a description of the location where the inventory electronic device 104A is currently or was last located, and/or a time reflective of when the status change occurred.

Figure 9:
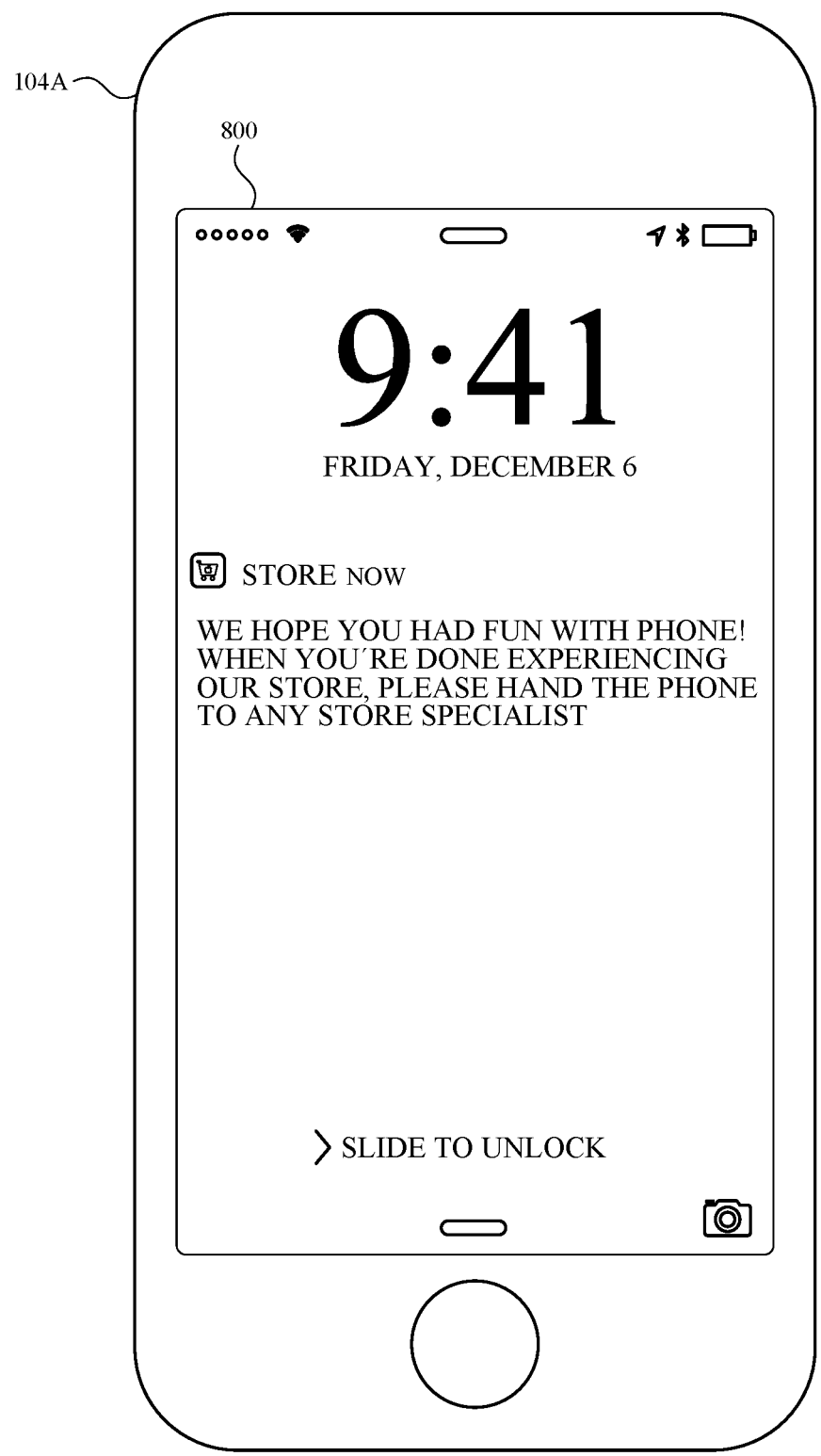
FIG. 9 illustrates an example inventory electronic device displaying an example alert output user interface in accordance with one or more implementations.

FIG. 9 illustrates an example inventory electronic device 104A displaying an example alert output user interface 800 in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The alert output user interface 800 provides a message that implicitly and/or indirectly indicates that the user has taken the inventory electronic device 104A into a security risk area 101.

Figure 10:
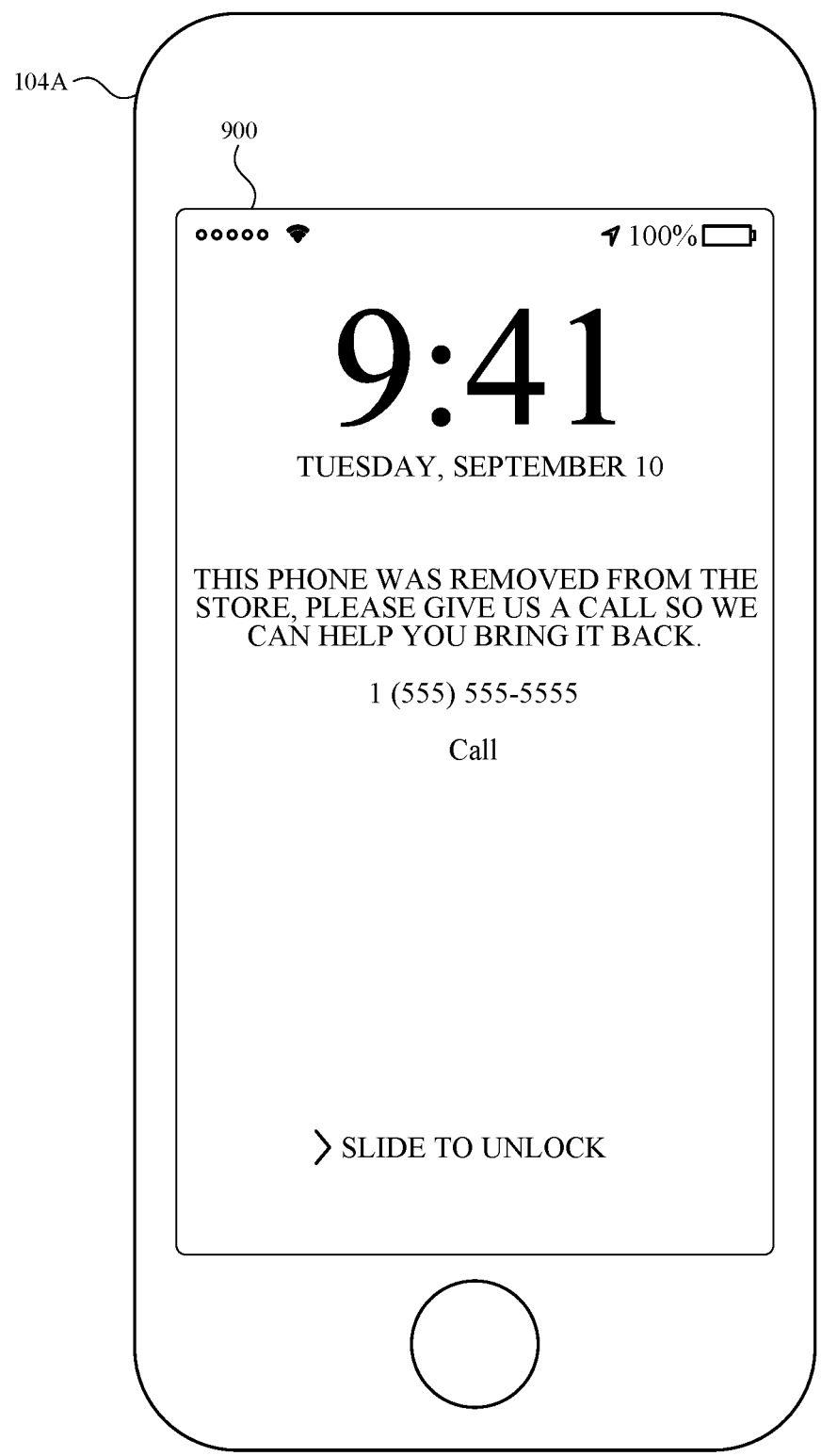
FIG. 10 illustrates an example inventory electronic device displaying an example disturbance output user interface in accordance with one or more implementations.

FIG. 10 illustrates an example inventory electronic device 104A displaying an example disturbance output user interface 900 in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The disturbance output user interface 900 provides a message that explicitly and directly indicates that the user has taken the inventory electronic device 104A outside of the security area 100. In conjunction with the disturbance output user interface 900, the hardware buttons of the inventory electronic device 104A may be disabled but the touch input of the inventory electronic device 104A may still enabled to give the user an opportunity to call the store to report that they accidentally removed the inventory electronic device 104A from the security area. However, after a threshold amount of time has passed since the inventory electronic device 104A was removed from the security area 100, the touch input of the inventory electronic device 104A may also be disabled.

Figure 11:
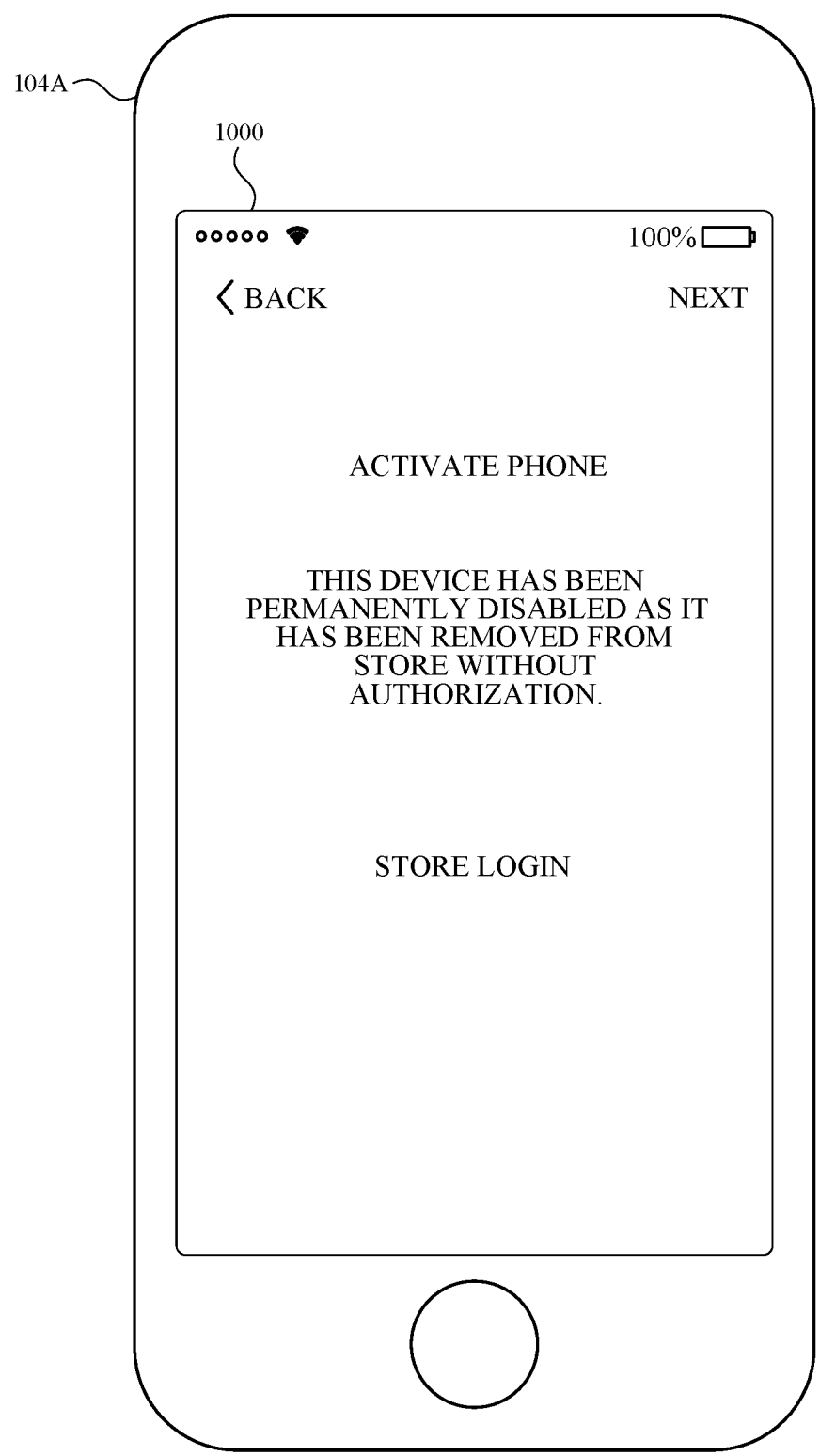
FIG. 11 illustrates an example inventory electronic device displaying an example disturbance output user interface in accordance with one or more implementations.

FIG. 11 illustrates an example inventory electronic device 104A displaying an example disturbance output user interface 1000 in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The disturbance output user interface 1000 provides a message that explicitly and directly indicates that the user has taken the inventory electronic device 104A outside of the security area 100 without authorization and further indicates that the inventory electronic device 104A has been permanently disabled. In one or more implementations, the disturbance output user interface 1000 may be displayed after a user installs a new operating system on the inventory electronic device 104A when the inventory electronic device 104A is outside of the security area 100.

Figure 12:
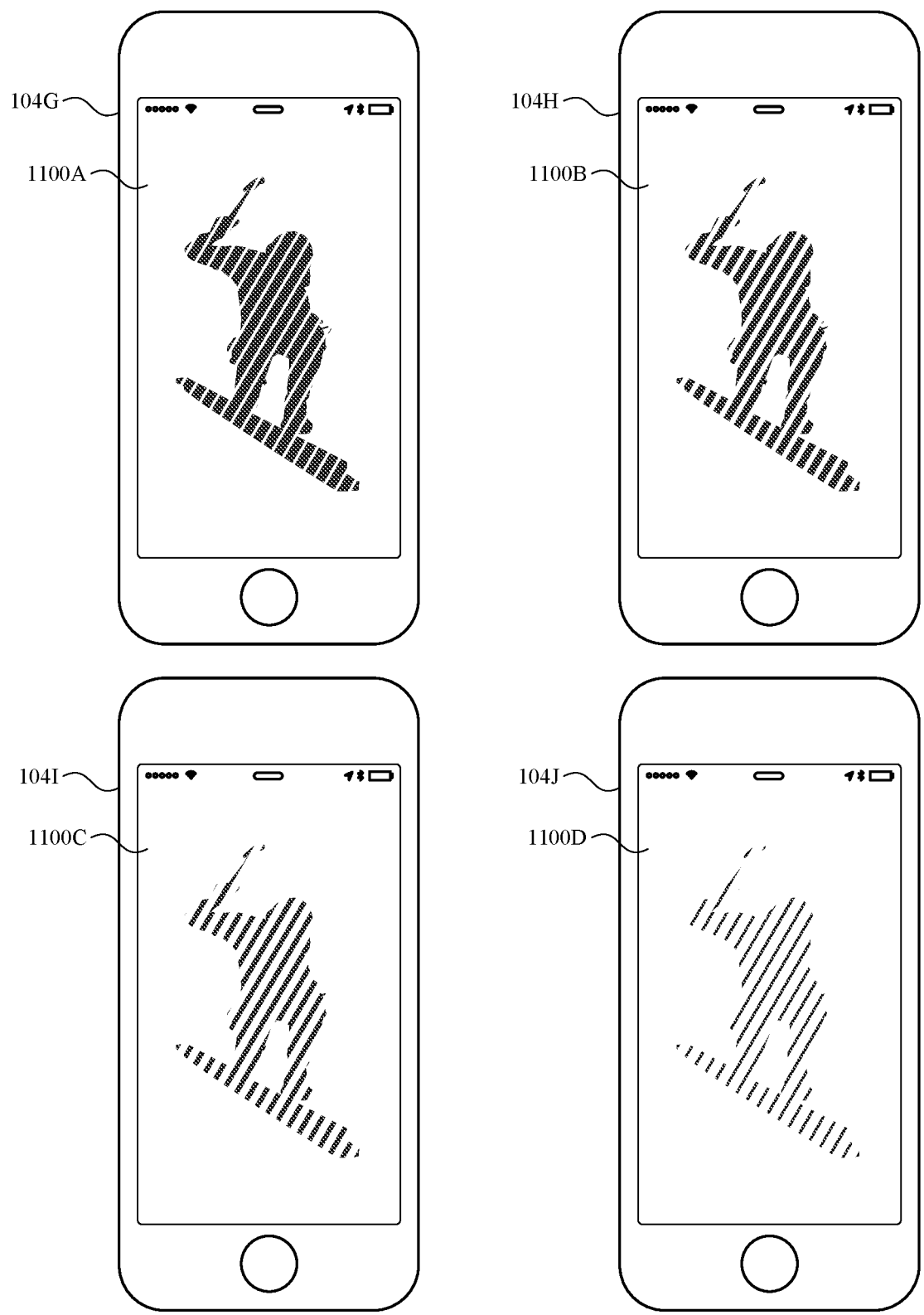
FIG. 12 illustrates example inventory electronic devices implementing different blurring states in accordance with one or more implementations.

FIG. 12 illustrates example inventory electronic devices 104G-J implementing different blurring states in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

As shown in FIG. 12, the user interface 1100A of the electronic device 104G is implementing a first blur state where the user interface 1100A is only slightly blurred, such as, for example, 25% blurred. In this instance, the electronic device 104G may be just outside of a threshold distance from its home location (or any other preferred location or specified area). The user interface 1100B of the electronic device 104H is implementing a second blur state where the user interface 1100B is more blurred than the user interface 1100A, such as, for example, 50% blurred. In this instance, the electronic device 104H may be further from its home location than the electronic device 104G.

The user interface 1100C of the electronic device 104I is implementing a third blur state where the user interface 1100C is more blurred than the user interface 1100B, such as, for example, 75% blurred. In this instance, the electronic device 104I may be further from its home location than the electronic device 104H. The user interface 1100D of the electronic device 104J is implementing a fourth blur state where the user interface 1100D is more blurred than the user interface 1100C, such as, for example, 99%, or 100%, blurred. In this instance, the electronic device 104J may be further from its home location than the electronic device 104I. In one or more implementations, the user interface 1100D may transition to a message that requests that the electronic device 104J be returned to its home location.

In one or more implementations, the blurring may occur continuously across a spectrum of blur as the electronic devices 104G-I are moved further away from their home or preferred location, e.g. rather than blurring at discrete points or levels. For explanatory purposes, the blurring intensity is described as being linearly proportional to the distance of the electronic devices 104G-I from their home location. However, the blurring intensity may also be exponentially related to the distance of the electronic devices 104G-I from their home locations. For example, the blurring may intensify at a slow rate when the electronic devices 104G-I are just outside of the threshold distance from their home locations; however, the blurring may start intensifying at a faster rate when the electronic devices 104G-I are moved further away from their home locations.

In one or more implementations, the blurring effect may be implemented in conjunction with providing relevant applications and/or information on the electronic devices 104G-I when the electronic devices 104G-I are moved near one of the bays 109A-B, such as to encourage users to keep the electronic devices 104G-I near a particular one of the bays 109A-B.

Figure 13:
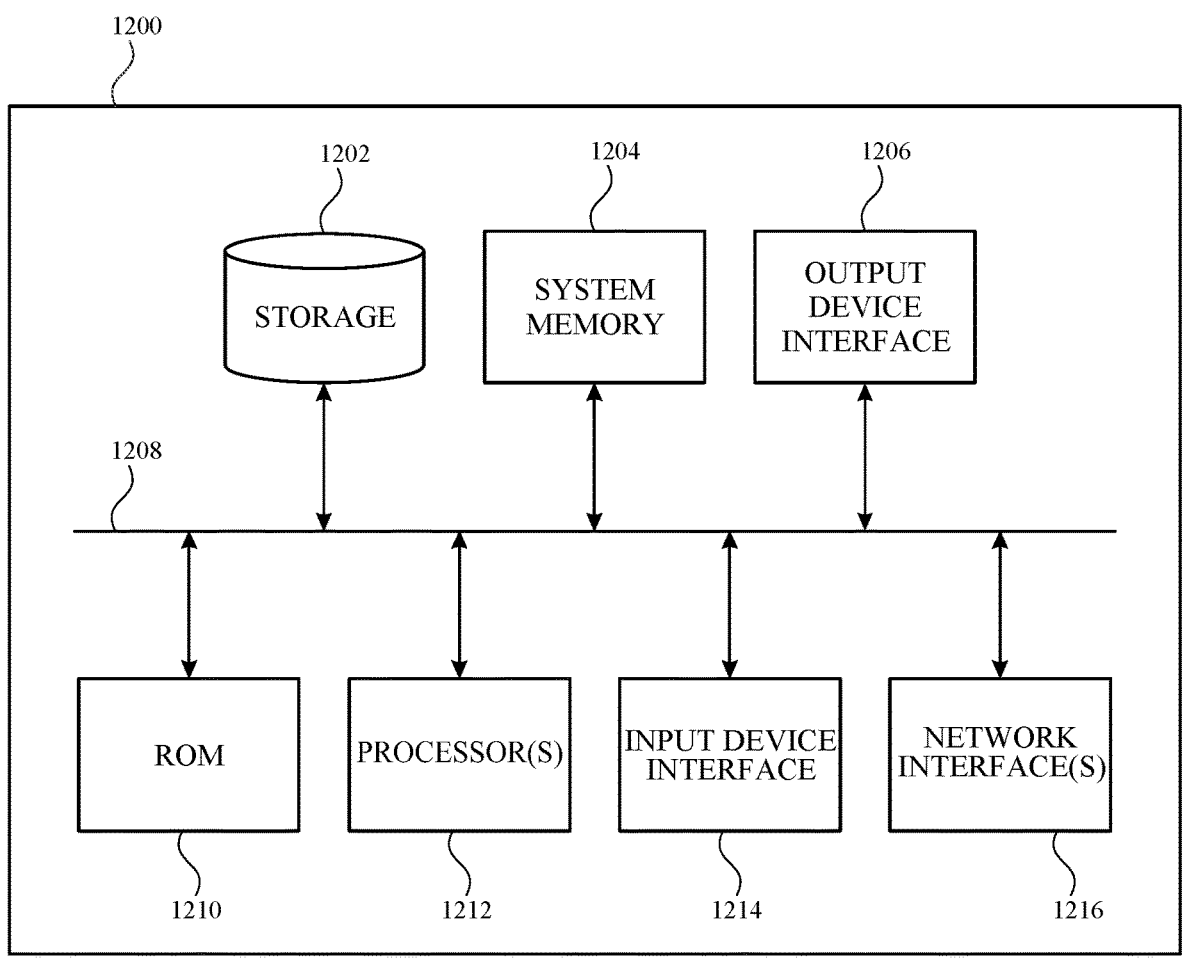
FIG. 13 illustrates an example electronic system with which aspects of the subject technology may be implemented in accordance with one or more implementations.

FIG. 13 illustrates an electronic system 1200 with which one or more implementations of the subject technology may be implemented. The electronic system 1200 can be, and/or can be a part of, one or more of the administrator electronic device 102, the inventory electronic devices 104A-X, the beacon electronic devices 106A-P, the security server 112, and/or the access point 108 shown in FIG. 2. The electronic system 1200 may include various types of computer readable media and interfaces for various other types of computer readable media. The electronic system 1200 includes a bus 1208, one or more processing unit(s) 1212, a system memory 1204 (and/or buffer), a ROM 1210, a permanent storage device 1202, an input device interface 1214, an output device interface 1206, and one or more network interfaces 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multi-core processor in different implementations.

The ROM 1210 stores static data and instructions that are needed by the one or more processing unit(s) 1212 and other modules of the electronic system 1200. The permanent storage device 1202, on the other hand, may be a read-and-write memory device. The permanent storage device 1202 may be a non-volatile memory unit that stores instructions and data even when the electronic system 1200 is off. In one or more implementations, a mass-storage device (such as a magnetic or optical disk and its corresponding disk drive) may be used as the permanent storage device 1202.

In one or more implementations, a removable storage device (such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processing unit(s) 1212 may need at runtime. In one or more implementations, the processes of the subject disclosure are stored in the system memory 1204, the permanent storage device 1202, and/or the ROM 1210. From these various memory units, the one or more processing unit(s) 1212 retrieves instructions to execute and data to process in order to execute the processes of one or more implementations.

The bus 1208 also connects to the input and output device interfaces 1214 and 1206. The input device interface 1214 enables a user to communicate information and select commands to the electronic system 1200. Input devices that may be used with the input device interface 1214 may include, for example, alphanumeric keyboards and pointing devices (also called "cursor control devices"). The output device interface 1206 may enable, for example, the display of images generated by electronic system 1200. Output devices that may be used with the output device interface 1206 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1208 also couples the electronic system 1200 to one or more networks and/or to one or more network nodes, through the one or more network interface(s) 1216. In this manner, the electronic system 1200 can be a part of a network of computers (such as a LAN, a wide area network ("WAN"), or an Intranet, or a network of networks, such as the Internet. Any or all components of the electronic system 1200 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   determining, by an electronic device, whether the electronic device is outside of a security area;
   receiving, from an additional device that is outside of the security area and proximate to the electronic device, an additional identifier of the additional device; and
   transmitting, from the electronic device and to a server and when the electronic device is moved outside of the security area, a message comprising an identifier of the electronic device and the additional identifier of the additional device.

2. The method of claim 1, wherein the message further comprises a location of the electronic device and the additional device.

3. The method of claim 1, further comprising:
   receiving, from the additional device, data collected by a sensor of the additional device; and
   transmitting, from the electronic device and to the server, the data.

4. The method of claim 1, wherein determining whether the electronic device is outside of the security area comprises determining whether the electronic device is outside of the security area for more than a threshold amount of time.

5. The method of claim 1, wherein determining whether the electronic device is outside of the security area comprises:
   establishing, via a communication interface of the electronic device, a connection with an access point; and
   determining a location of the electronic device with respect to the security area based at least in part on a communication with the access point.

6. The method of claim 1, further comprising providing an alert output when a location of the electronic device is proximate to a boundary of the security area, wherein the alert output comprises a notification message displayed on the electronic device, an audio alert output by the electronic device, or a vibration of the electronic device.

7. The method of claim 1, wherein:
   the additional device is one of multiple additional devices; and
   the message is transmitted when a number of the additional devices outside the security area exceeds a threshold amount.

8. An electronic device comprising
   a communication interface for communicating with a server; and
   a processor configured to:
      determine whether the electronic device is outside of a security area;
      determine whether the electronic device is proximate to an additional device that is outside of the security area and has a sensor for collecting data;
      receiving the data from the additional device; and
      transmitting the data to the server.

9. The electronic device of claim 8, wherein the sensor comprises a light sensor, a proximity sensor, a temperature sensor, an infrared light sensor, an accelerometer, a gyroscope, or a compass.

10. The electronic device of claim 8, wherein the processor is further configured to:
   establish, via the communication interface, a connection with an access point; and
   determine a location of the electronic device with respect to the security area based at least in part on a communication with the access point.

11. The electronic device of claim 8, wherein the data comprises an image of a user who most recently interacted with the additional device, the image being captured by the sensor.

12. The electronic device of claim 8, wherein the processor is further configured to transmit, to the server and when the electronic device is moved outside of the security area, a message comprising an identifier of the electronic device and an additional identifier of the additional device.

13. The electronic device of claim 8, wherein the processor is further configured to provide an alert output when a location of the electronic device is proximate to a boundary of the security area, wherein the alert output comprises a notification message displayed on the electronic device, an audio alert output by the electronic device, or a vibration of the electronic device.

14. The electronic device of claim 8, wherein the processor is further configured to prevent the electronic device from responding to at least some user input when a location of the electronic device is outside of the security area.

15. The electronic device of claim 8, wherein the processor is further configured to provide a disturbance output when a location of the electronic device is outside of the security area.

16. The method of claim 1, further comprising:
   determining a collective battery life for the electronic device and the additional device; and
   generating a schedule for performing tasks by the electronic device and the additional device while the electronic device and the additional device are outside of the security area and proximate to each other, to conserve the collective battery life.

17. The electronic device of claim 8, wherein the processor is further configured to:
   determine a collective battery life for the electronic device and the additional device; and
   generate a schedule for performing tasks by the electronic device and the additional device while the electronic device and the additional device are outside of the security area and proximate to each other, to conserve the collective battery life.

18. A method comprising:
   determining, by an electronic device, whether the electronic device is outside of a security area;
   transmitting, to an additional device that is outside of the security area and proximate to the electronic device, an identifier of the electronic device; and
   generating a schedule for performing tasks by the electronic device and the additional device while the electronic device and the additional device are outside of the security area and proximate to each other, the tasks comprising transmitting to a server a message comprising the identifier of the electronic device and an additional identifier of the additional device.

19. The method of claim 18, wherein the message further comprises a location of the electronic device and the additional device.

20. The method of claim 18, further comprising determining a collective battery life for the electronic device and the additional device, wherein the schedule for performing tasks is to conserve the collective battery life.

* * * * *